US012554748B2

(12) United States Patent
Verma et al.

(10) Patent No.: US 12,554,748 B2
(45) Date of Patent: Feb. 17, 2026

(54) GENERATING SHORTCUT PATHS BETWEEN RELATED OBJECTS

(71) Applicant: Tableau Software, LLC, Seattle, WA (US)

(72) Inventors: Harsh Verma, Kirkland, WA (US); Ramakrishna Casturi, Redwood, WA (US); Tyler James-Buker Doyle, Seattle, WA (US); Arun Durairaju, Sammamish, WA (US); Tao Tao, Kirkland, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 18/540,844

(22) Filed: Dec. 14, 2023

(65) Prior Publication Data

US 2024/0111791 A1 Apr. 4, 2024

Related U.S. Application Data

(63) Continuation of application No. 17/409,299, filed on Aug. 23, 2021, now abandoned.

(51) Int. Cl.
*G06F 16/28* (2019.01)
*G06F 16/22* (2019.01)
(Continued)

(52) U.S. Cl.
CPC ........ *G06F 16/288* (2019.01); *G06F 16/2246* (2019.01); *G06F 16/2457* (2019.01); *G06F 16/248* (2019.01); *G06F 16/26* (2019.01)

(58) Field of Classification Search
None
See application file for complete search history.

(56) References Cited

U.S. PATENT DOCUMENTS 5,550,971 A 8/1996 Brunner et al.
5,689,711 A 11/1997 Bardasz et al.
(Continued)

FOREIGN PATENT DOCUMENTS

WO 2006060773 A2 6/2006

OTHER PUBLICATIONS

Polyviou et al. , Query by Browsing: A Visual Query Language Based on the Relational Model and the Desktop User Interface Paradigm, 2001 (Year: 2001).*
(Continued)

*Primary Examiner* — Dawaune A Conyers
(74) *Attorney, Agent, or Firm* — Morgan, Lewis & Bockius LLP

(57) ABSTRACT

A method executes at a computing device having one or more processors and memory. The device identifies a set of objects for a data visualization platform, each object in the set of objects representing a database, a data source, a table, a data field, a user, a visualization worksheet, or a calculated field. The device generates a data model from the set of objects. Each object of the set of objects is represented as a node in the data model and each directed edge in the data model identifies a relationship between a pair of objects. The device generates one or more shortcuts in the data model according to object types of the objects in the set of objects. Each shortcut represents a relationship, between a respective pair of objects, not represented by a directed edge. Then the device stores the data model, including the generated shortcuts, in the memory.

17 Claims, 16 Drawing Sheets

(51) Int. Cl.

| | |
|---|---|
| ***G06F 16/2457*** | (2019.01) |
| ***G06F 16/248*** | (2019.01) |
| ***G06F 16/26*** | (2019.01) |

(56) References Cited

U.S. PATENT DOCUMENTS

| | | | |
|---|---|---|---|
| 8,286,087 | B1 | 10/2012 | Xian et al. |
| 9,383,913 | B2 | 7/2016 | Hoyer et al. |
| 9,489,119 | B1 | 11/2016 | Smith, Jr. |
| 9,760,240 | B2 | 9/2017 | Maheshwari et al. |
| 9,881,066 | B1 | 1/2018 | Yousaf et al. |
| 10,275,265 | B1 | 4/2019 | Gould et al. |
| 10,445,170 | B1 | 10/2019 | Subrarnanian et al. |
| 10,705,695 | B1 | 7/2020 | Porath et al. |
| 10,783,162 | B1 | 9/2020 | Montague et al. |
| 11,566,909 | B2 * | 1/2023 | Hidayat ............. G01C 21/3461 |
| 2004/0205562 | A1 | 10/2004 | Rozek et al. |
| 2006/0064674 | A1 | 3/2006 | Olson, Jr. et al. |
| 2008/0126987 | A1 | 5/2008 | Meschian et al. |
| 2009/0006939 | A1 | 1/2009 | DeSpain et al. |
| 2009/0007122 | A1 | 1/2009 | Peyton et al. |
| 2009/0012983 | A1 | 1/2009 | Senneville et al. |
| 2010/0114629 | A1 | 5/2010 | Adler et al. |
| 2010/0133420 | A1 | 6/2010 | Bator et al. |
| 2010/0235771 | A1 | 9/2010 | Gregg, III |
| 2010/0313157 | A1 | 12/2010 | Carlsson et al. |
| 2010/0318583 | A1 | 12/2010 | Cohen |
| 2011/0219321 | A1 | 9/2011 | Gonzalez Veron et al. |
| 2012/0311497 | A1 | 12/2012 | Bear et al. |
| 2014/0026084 | A1 | 1/2014 | Gilboa |
| 2014/0058789 | A1 | 2/2014 | Doehring et al. |
| 2014/0074888 | A1 | 3/2014 | Potter et al. |
| 2014/0114907 | A1 | 4/2014 | Kozina et al. |
| 2014/0215405 | A1 | 7/2014 | Breedvelt-Schouten |
| 2014/0267287 | A1 | 9/2014 | Dodgen et al. |
| 2014/0330821 | A1 | 11/2014 | Tullis et al. |
| 2014/0372956 | A1 | 12/2014 | Bisca et al. |
| 2015/0112998 | A1 | 4/2015 | Shankar et al. |
| 2015/0317336 | A1 * | 11/2015 | Dubsky ................. G06F 16/285 707/803 |
| 2015/0339263 | A1 | 11/2015 | Abu El Ata et al. |
| 2015/0347091 | A1 | 12/2015 | Ferko et al. |
| 2016/0078361 | A1 | 3/2016 | Brueckner et al. |
| 2016/0103908 | A1 | 4/2016 | Fletcher et al. |
| 2016/0224532 | A1 | 8/2016 | Miller et al. |
| 2016/0224616 | A1 | 8/2016 | Beacom et al. |
| 2016/0232207 | A1 | 8/2016 | Brunel et al. |
| 2016/0314605 | A1 | 10/2016 | Filippi et al. |
| 2017/0010787 | A1 | 1/2017 | Ranganathan et al. |
| 2017/0075557 | A1 | 3/2017 | Noble et al. |
| 2017/0091317 | A1 | 3/2017 | Cummings et al. |
| 2017/0102694 | A1 | 4/2017 | Enver et al. |
| 2017/0103103 | A1 | 4/2017 | Nixon et al. |
| 2017/0140068 | A1 | 5/2017 | Oh et al. |
| 2017/0154088 | A1 | 6/2017 | Sherman |
| 2017/0161188 | A1 | 6/2017 | Isoi |
| 2017/0177681 | A1 | 6/2017 | Potiagalov et al. |
| 2017/0177744 | A1 | 6/2017 | Potiagalov et al. |
| 2017/0178368 | A1 | 6/2017 | Noon et al. |
| 2017/0193049 | A1 | 7/2017 | Grehant |
| 2017/0213131 | A1 | 7/2017 | Hammond et al. |
| 2017/0220633 | A1 | 8/2017 | Porath et al. |
| 2017/0286526 | A1 | 10/2017 | Bar-Or et al. |
| 2017/0293666 | A1 | 10/2017 | Ragavan et al. |
| 2017/0316355 | A1 | 11/2017 | Shrestha et al. |
| 2018/0024731 | A1 | 1/2018 | Sanches et al. |
| 2018/0067998 | A1 | 3/2018 | Sherman et al. |
| 2018/0129369 | A1 | 5/2018 | Kim et al. |
| 2018/0157702 | A1 | 6/2018 | Clemens et al. |
| 2018/0218050 | A1 | 8/2018 | Porath et al. |
| 2018/0260106 | A1 | 9/2018 | Leonard et al. |
| 2018/0260903 | A1 | 9/2018 | Callery |
| 2019/0034489 | A1 | 1/2019 | Ziegler |
| 2019/0095395 | A1 | 3/2019 | Piecko |
| 2019/0188308 | A1 | 6/2019 | Simon et al. |
| 2019/0286668 | A1 | 9/2019 | Puzicha et al. |
| 2019/0294720 | A1 | 9/2019 | Beringer et al. |
| 2019/0325292 | A1 | 10/2019 | Remis et al. |
| 2019/0332599 | A1 | 10/2019 | Woo |
| 2019/0384836 | A1 | 12/2019 | Roth et al. |
| 2020/0104401 | A1 | 4/2020 | Burnett et al. |
| 2020/0104402 | A1 | 4/2020 | Burnett et al. |
| 2020/0175006 | A1 | 6/2020 | Hughes |
| 2020/0285803 | A1 | 9/2020 | Edge et al. |
| 2020/0372057 | A1 | 11/2020 | Tonkin et al. |
| 2020/0401623 | A1 | 12/2020 | Dilts et al. |
| 2021/0263900 | A1 | 8/2021 | Joyce et al. |
| 2021/0390420 | A1 | 12/2021 | Barnett |
| 2022/0113150 | A1 | 4/2022 | Hidayat |

OTHER PUBLICATIONS

Yip et al., "Improving Application Security with Data Flow Assertions", 2009 (Year: 2009).*

Pienta, Robert et al., "VISAGE: Interactive Visual Graph Querying," AVI '16, Jun. 7-10, 2016, Bari Italy, pp. 272-279.

Von Landesberger, Tatiana et al., "A System for Interactive Visual Analysis of Large Graphs Using Motifs in Graph Editing and Aggregation," VMV 2009, pp. 1-9.

Office Communication for U.S. Appl. No. 16/586,554 mailed Jul. 24, 2020, pp. 1-27.

Office Communication for U.S. Appl. No. 16/586,554 mailed Nov. 24, 2020, pp. 1-28.

Office Communication for U.S. Appl. No. 16/586,554 mailed Feb. 16, 2021, pp. 1-7.

Office Communication for U.S. Appl. No. 16/586,554 mailed Apr. 2, 2021, pp. 1-37.

Office Communication for U.S. Appl. No. 16/725,986 mailed Apr. 2, 2021, pp. 1-23.

Papenbrock, Thorsten et al., "Data-driven Schema Normalization," in Proceedings of the 20th International Conference on Extending Database Technology, 2017, pp. 342-353.

Brunel, Robert et al., "Supporting Hierarchical Data in SAP HANA," 2015 IEEE 31st International Conference on Data Engineering (ICDE), 2015, pp. 1-12.

Office Communication for U.S. Appl. No. 16/984,014 mailed Aug. 10, 2021, pp. 1-32.

Furmanova, Katarina et al., "Taggle: Scalable Visualization of Tabular Data through Aggregation," IEEE Transactions on Visualization and Computer Graphics, 2017, pp. 1-14.

Office Communication for U.S. Appl. No. 16/586,554 mailed Sep. 27, 2021, pp. 1-45.

Office Communication for U.S. Appl. No. 16/725,986 mailed Sep. 30, 2021, pp. 1-10.

Office Communication for U.S. Appl. No. 17/091,536 mailed Nov. 5, 2021, pp. 1-25.

Office Communication for U.S. Appl. No. 16/944,043 mailed Nov. 26, 2021, pp. 1-49.

Office Communication for U.S. Appl. No. 16/586,554 mailed Dec. 15, 2021, pp. 1-7.

Office Communication for U.S. Appl. No. 16/984,014 mailed Jan. 3, 2022, pp. 1-31.

Office Communication for U.S. Appl. No. 16/586,554 mailed Feb. 24, 2022, pp. 1-47.

Office Communication for U.S. Appl. No. 16/984,014 mailed Mar. 18, 2022, pp. 1-5.

Office Communication for U.S. Appl. No. 16/944,043 mailed Apr. 19, 2022, pp. 1-10.

Office Communication for U.S. Appl. No. 16/984,014 mailed Apr. 20, 2022, pp. 1-33.

Office Communication for U.S. Appl. No. 17/091,536 mailed Apr. 25, 2022, pp. 1-32.

Office Communication for U.S. Appl. No. 17/091,536 mailed Jul. 7, 2022, pp. 1-5.

Office Communication for U.S. Appl. No. 17/091,536 mailed Aug. 16, 2022, pp. 1-38.

Gillis, Alexander S. et al., "What is integrated development environment (IDE)?—Definition from Whatis.com," Sep. 2018, TechTarget,

(56) References Cited

OTHER PUBLICATIONS https://www.techtarget.com/searchsoftwarequality/definition/integrated-development-environment, Accessed: Aug. 16, 2022, pp. 1-4.
Office Communication for U.S. Appl. No. 16/586,554 mailed Aug. 17, 2022, pp. 1-56.
Office Communication for U.S. Appl. No. 17/370,367 mailed Sep. 1, 2022, pp. 1-13.
International Search Report and Written Opinion for International Patent Application No. PCT/US2022/034283 mailed Oct. 27, 2022, pp. 1-12.
Office Communication for U.S. Appl. No. 16/586,554 mailed Nov. 21, 2022, pp. 1-6.
Office Communication for U.S. Appl. No. 16/586,554 mailed Jan. 5, 2023, pp. 1-24.
Office Communication for U.S. Appl. No. 17/370,367 mailed Jan. 27, 2023, pp. 1-14.
Bauer et al., "The Shortcut Problem—Complexity and Algorithms", 2012 (Year: 2012).
Hesse, "Directed Graphs Requiring Large Numbers of Shortcuts", 2002 (Year: 2002).
International Search Report arid Written Opinion for International Patent Application No. PCTIUS2020/023163 mailed Jul. 21, 2020, pp. 1-7.
Office Communication for U.S. Appl. No. 16/389,389 mailed May 13, 2021, pp. 1-16.
Office Communication for U.S. Appl. No. 16/389,389 mailed Aug. 18, 2021, pp. 1-9.
Office Communication for U.S. Appl. No. 17/542,148 mailed Oct. 27, 2022, pp. 1-14.
International Search Report and Written Opinion for International Patent Application No. PCT/US2022/038328 mailed Nov. 30, 2022, pp. 1-12.
Office Communication for U.S. Appl. No. 17/542,148 mailed Feb. 17, 2023, pp. 1-8.
Office Communication for U.S. Appl. No. 17/542,148 mailed Feb. 28, 2023, pp. 1-2.
Office Communication for U.S. Appl. No. 17/091,536 mailed Mar. 10, 2023, pp. 1-10.
Office Communication for U.S. Appl. No. 17/091,536 mailed Mar. 16, 2023, pp. 1-3.
Office Communication for U.S. Appl. No. 17/370,367 mailed Apr. 6, 2023, pp. 1-4.
Office Communication for U.S. Appl. No. 17/370,367 mailed May 24, 2023, pp. 1-18.
Office Communication for U.S. Appl. No. 17/535,465 mailed Jun. 8, 2023, pp. 1-7.
Office Communication for U.S. Appl. No. 17/091,536 mailed Jul. 24, 2023, pp. 1-7.
Office Communication for U.S. Appl. No. 17/091,536 mailed Aug. 2, 2023, pp. 1-3.
Office Communication for U.S. Appl. No. 17/535,465 mailed Aug. 9, 2023, pp. 1-8.
Office Communication for Singaporean Patent Application No. 11202111528R mailed Aug. 16, 2023, pp. 1-5.
Verma, Office Action, U.S. Appl. No. 17/409,299, Feb. 14, 2023, 28 pgs.
Verma, Final Office Action, U.S. Appl. No. 17/409,299, Jun. 28, 2023, 36 pgs.
Verma, Notice of Allowance, U.S. Appl. No. 17/409,299, Sep. 14, 2023, 8 pgs.

* cited by examiner

800

802, 804, 806, 808, 810, 812

```
dataFlowBoundaries: [
  {
    sourceType: "Column"
    edgeLabel: "referencedByFields"
    targetType: "ColumnField"
    direction: "down"
  },
  {
    sourceType: "Field"
    edgeLabel: "referencedBySheets"
    targetType: "Sheet"
    direction: "down"
  },
  {
    sourceType: "ColumnField"
    edgeLabel: "referencedBySheets"
    targetType: "Sheet"
    direction: "down"
  },
  {
    sourceType: "CalculatedField"
    edgeLabel: "referencedBySheets"
    targetType: "Sheet"
    direction: "down"
  }
]
```

Figure 8

```
closures: [                                    ← 902
  {
    sourceType: "Column"              ← 906
    edgeLabel: "table"                ← 908
    targetType: "Table"               ← 910
    directions: ["up", "down"]        ← 912
  },                                  ⎬ 904
  {
    sourceType: "Table"
    edgeLabel: "database"
    targetType: "Database"
    directions: ["up", "down"]
  },
  {
    sourceType: "Field"
    edgeLabel: "referencedByCalculatedFields"
    targetType: "CalculatedField"
    directions: ["down"]
  },
  {
    sourceType: "ColumnField"
    edgeLabel: "referencedByCalculatedFields"
    targetType: "CalculatedField"
    directions: ["down"]
  },
  {
    sourceType: "Field"
    edgeLabel: "datasource"
    targetType: "Datasource"
    directions: ["up", "down"]
  },
  {
    sourceType: "ColumnField"
    edgeLabel: "datasource"
    targetType: "Datasource"
    directions: ["up", "down"]
  },
  ...
}
```

Figure 9

GENERATING SHORTCUT PATHS BETWEEN RELATED OBJECTS

RELATED APPLICATIONS

This application is a continuation of U.S. patent application Ser. No. 17/409,299, filed Aug. 23, 2021, titled "Generating Shortcut Paths Between Related Objects," which is incorporated herein by reference in its entirety.

TECHNICAL FIELD

The present invention relates generally to data visualization, and more particularly, but not exclusively, to managing the data associated with objects included in visualizations.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. Accordingly, in some cases, organizations may employ various applications or tools to generate visualizations based on some or all of their data. Employing visualizations to represent data may enable organizations to improve their understanding of business operations, sales, customer information, employee information, key performance indicators, or the like. In some cases, sophisticated visualizations may incorporate or otherwise depend on data from a variety of sources within an organization, including different databases. In some cases, many different visualizations may depend on these varied or disparate data sources. Often it may be important to enable to users to identify relationships between different dependent objects that may be used for interacting with those objects. In some cases, manual determination of relationships between some different objects may be prone to error because of the many varied or disparate objects that may be represented. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings.

FIG. 8 illustrates a representation of a data structure for representing data flow boundaries for data models in accordance with one or more of the various embodiments.

FIG. 9 illustrates a representation of a data structure for representing closure hints for generating shortcut paths between related objects in accordance with one or more of the various embodiments.

DETAILED DESCRIPTION OF THE VARIOUS EMBODIMENTS

Figure 1:
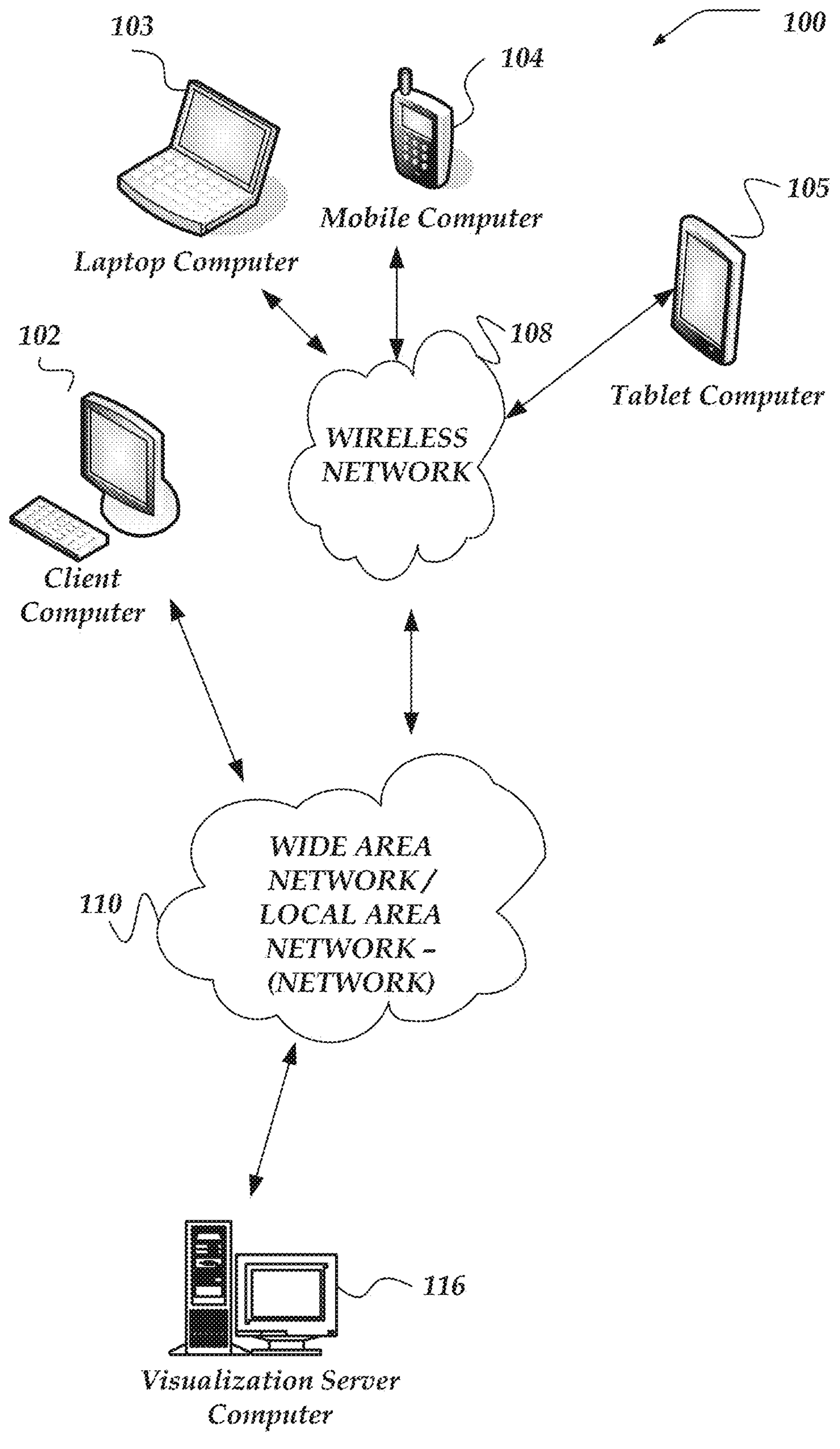
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, Kotlin, PHP, Perl, JavaScript, Ruby, VB Script, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine. Also, in some embodiments, one or more portions of an engine may be a hardware device, ASIC, FPGA, or the like, that performs one or more actions in the support of an engine or as part of the engine.

As used herein the term "data model" refers to one or more data structures that represent one or more entities associated with data collected or maintained by an organization. Data models are typically arranged to model various operations or activities associated with an organization. In some cases, data models are arranged to provide or facilitate various data-focused actions, such as, efficient storage, queries, indexing, search, updates, or the like. Generally, a data model may be arranged to provide features related to data manipulation or data management rather than providing an easy to understand presentation or visualizations of the data.

As used herein the term "data object" refers to one or more entities or data structures that comprise data models. In some cases, data objects may be considered portions of the data model. Data objects may represent classes or kinds of items, such as, databases, data-sources, tables, workbooks, visualizations, work-flows, or the like.

As used herein the term "data object class" or "object class" refers to a one or more entities or data structures that represent a class, kind, or type of data objects.

As used herein the term "object" refers an object that represents a class or kind of object. For example, Table and Column may each be objects while Table A and Column B of Table A may be considered instances of the object type Table and object type Column respectively.

As used herein the term "schema model" refers to data structures the represent the various objects and relationships between those objects. Schema models may be considered data models that define objects, object relationships, and so on.

As used herein the term "closure" refers to a portion of nodes and edges of a schema model that may be separated by a data flow boundary. In some cases, closures may be informally considered to be partitions of a schema model. Schema models may declare more than one closure.

As used herein the terms "data flow boundary," "flow boundary," or "flow" refer an edge in a schema model that may be defined to separate portions of the schema model into closures. Schema models may declare more than one flow boundaries.

As used herein the term "shortcut" refers to declared directed path in a schema model that extends from a source object node to a target object node. Shortcut definitions may include at least a source object, a target object, and a path direction. Thus, a fully realized shortcut is a path in the schema model from a source object to a target object that is comprised of edges and nodes in the schema model.

As used herein the term "display model" refers to one or more data structures that represent one or more representations of a data model that may be suitable for use in a visualization that is displayed on one or more hardware displays. Display models may define styling or user interface features that may be made available to non-authoring user.

As used herein, the term "display object" refers to one or more data structures that comprise display models. In some cases, display objects may be considered portions of the display model. Display objects may represent individual instances of items or entire classes or kinds of items that may be displayed in a visualization. In some embodiments, display objects may be considered or referred to as views because they provide a view of some portion of the data model.

As used herein, the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein, the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data using a network computers. In one or more of the various embodiments, a data model that includes one or more objects, one or more object relationships, one or more shortcuts, or the like, may be provided such that each object may be represented by a node in the data model and each object relationship may be represented by a pair of opposite sense directed edges edge in the data model.

In one or more of the various embodiments, in response to a query for determining a directed path in the data model for a shortcut further actions may be performed including: determining a current source object and a current target object based on the shortcut; determining one or more candidate nodes and one or more traversal edges based on the data model, the current target object, and the current source object such that each traversal edge may correspond to a object relationship between two objects included in the data model, the one or more candidate nodes and the one or more traversal edges; generating a tree based on the one or more candidate nodes and the one or more traversal edges; removing one or more leaf nodes of the tree such that one or more remaining leaf nodes may correspond to the current target object; removing one or more branches of the tree such that the one or more removed branches may correspond to one or more duplicate traversal edges in the tree; determining the directed path in the data model connecting the current source object to the current target object based on a remainder of the one or more candidate nodes in the tree and a remainder of the one or more traversal edges in the tree; and generating a response to the query based on employing the directed path to traverse the data model from the current source object to the current target object.

In one or more of the various embodiments, determining the one or more candidate nodes and the one or more traversal edges may include: providing one or more closure source objects, one or more closure target objects, and one of more directed closure edges that may be associated with the data model; generating one or more closures based on the one or more closure source objects, the one or more closure target objects, and the one of more directed closure edges; determining the one or more candidate nodes based a portion of the one or more closures associated with the target object and the source object; determining the one or more traversal edges based on the portion of the one or more closures; or the like.

In one or more of the various embodiments, determining the one or more traversal edges may include: providing one or more flow source objects, one or more flow target objects, and one of more directed flow edges that are associated with the data model; generating one or more flow boundaries based on the one or more flow source objects, the one or more flow target objects, and the one of more directed flow edges such that each flow boundary indicates a transition boundary between the one or more objects in the data model; adding the one or more directed flow edges to the one or more traversal edges; or the like.

In one or more of the various embodiments, a data store may be employed to provide one or more persisted shortcuts associated with the data model such that each persisted shortcut may provide another directed path between another source object and another target object; and, in response to determining one or more portions of the directed path that correspond to the one or more persisted shortcuts, substituting the corresponding one or more persisted shortcuts for the one or more portions of the directed path.

In one or more of the various embodiments, the data model may be modified based on including one or more other objects or including one or more other object relationships. In some embodiments, another directed path may be generated based on the modified data model and the one or more shortcuts. And, in some embodiments, the other directed path may be provided as a substitute to the directed path.

In one or more of the various embodiments, providing the data model may include automatically generating one or more directed paths for each shortcut in the absence of the query.

In one or more of the various embodiments, providing the data model may include: providing one or more compound objects that may be comprised of one or more other objects; and providing more than one node in the data model that may represent a same object.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
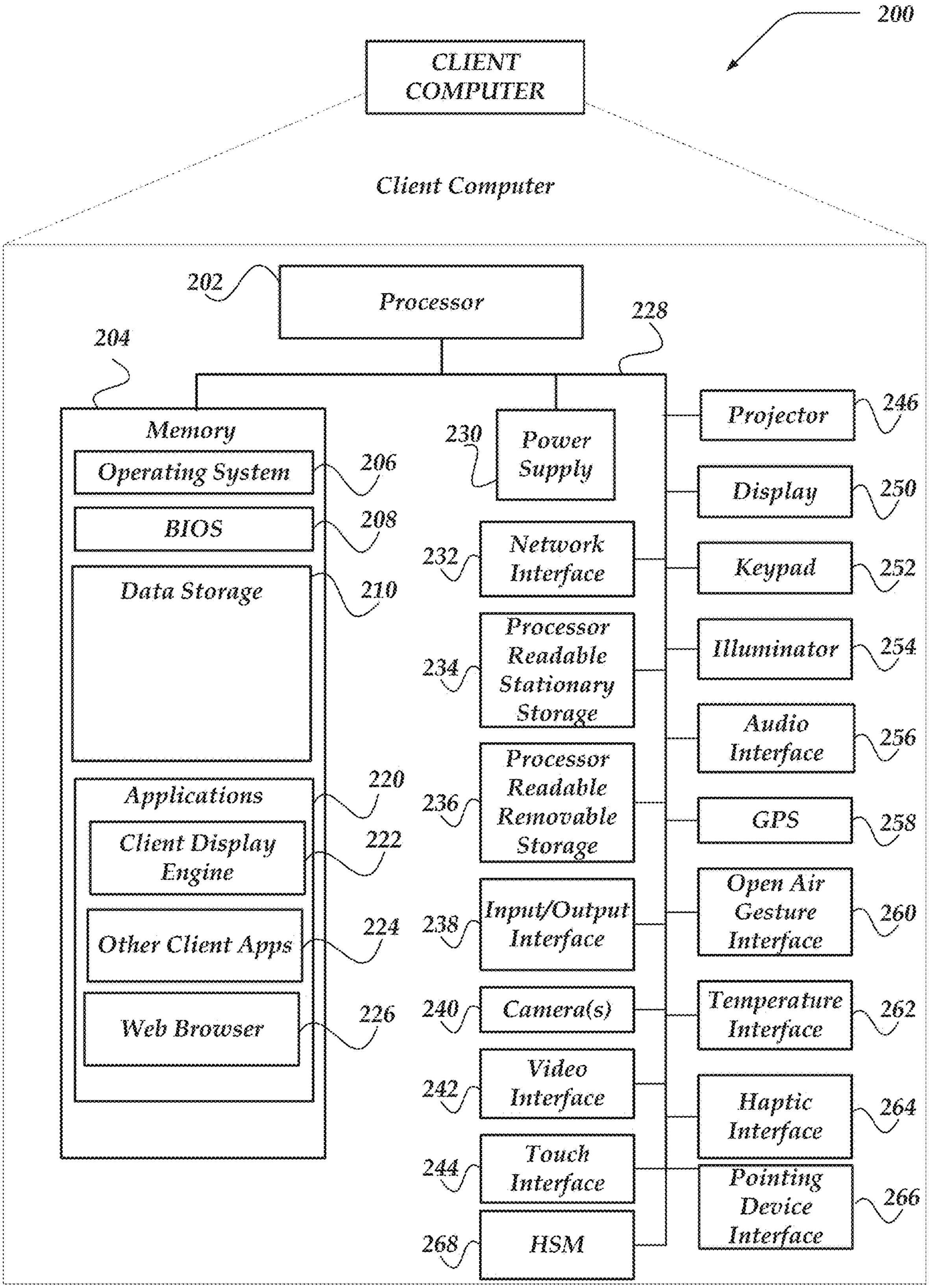
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (ALPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, client display engine 222, other client apps 224, web browser 226, or the like, may be arranged to employ geo-location information to select one or more localization features, such as, time zones, languages, currencies, calendar formatting, or the like. Localization features may be used in documents, visualizations, display objects, display models, action objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, Microsoft Windows® or a specialized client computer communication operating system such as, Android™, or the Apple® Corporation's iOS. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client display engine 222, other client applications 224, web browser 226, or the like. Client computers may be arranged to exchange communications, such as, queries, searches, messages, notification messages, event messages, alerts, performance metrics, log data, API calls, or the like, combination thereof, with visualization server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
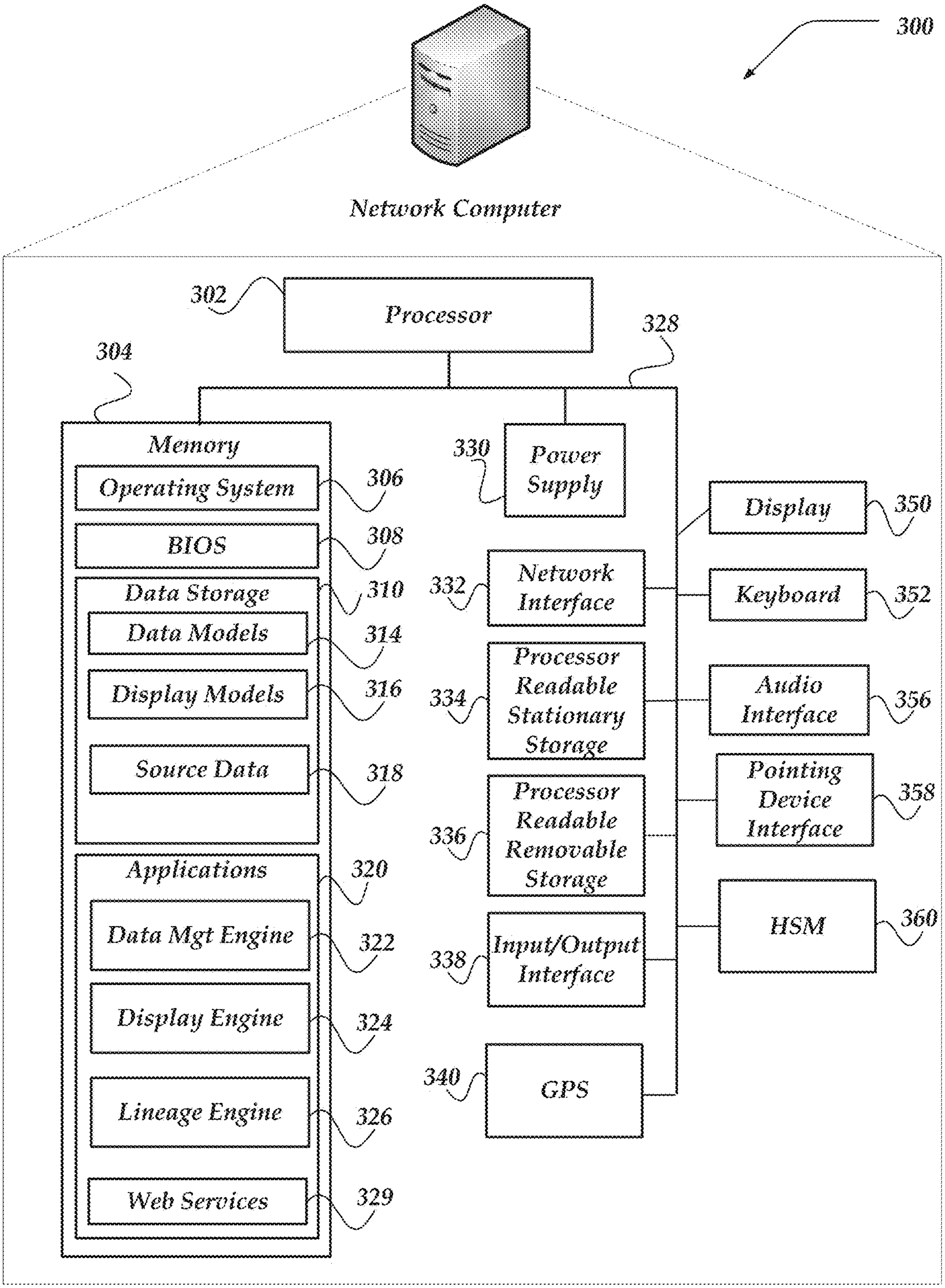
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more visualization server computer 116 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™ Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (ALPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, data management engine 322, display engine 324, lineage engine 326, web services 329, or the like, may be arranged to employ geo-location information to select one or more localization features, such as, time zones, languages, currencies, currency formatting, calendar formatting, or the like. Localization features may be used in documents, file systems, user-interfaces, reports, display objects, display models, visualizations as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, display models 316, source data 318, or the like. Data models 314 may store files, documents, versions, properties, meta-data, data structures, or the like, that represent one or more portions of one or more data models. Display models 316 may store display models. Source Data 318 may represent memory used for storing databases, or other data sources that contribute the data that underlies the data models, display models, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include data management engine 322, display engine 324, lineage engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, data management engine 322, display engine 324, lineage engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to data management engine 322, display engine 324, web services 329, or the like, may be provisioned and de-commissioned automatically.

Also, in one or more of the various embodiments, data management engine 322, display engine 324, lineage engine 326, web services 329, or the like, may be located in virtual servers running in a cloud-based computing environment rather than being tied to one or more specific physical network computers.

Further, network computer 300 may also include hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
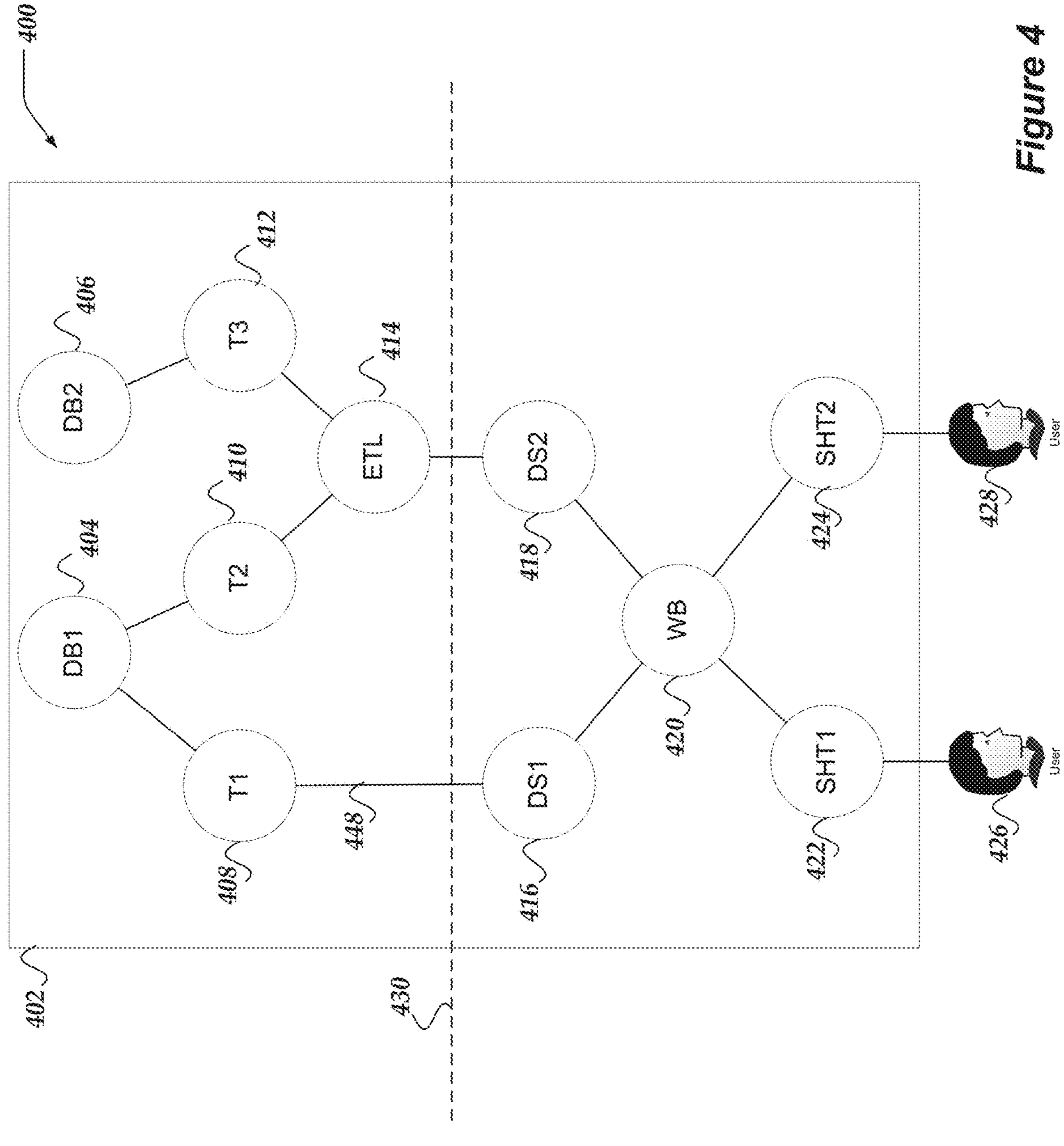
FIG. 4 illustrates a logical architecture of a system for generating shortcut paths between related objects in accordance with one or more of the various embodiments.

FIG. 4 illustrates a logical architecture of system 400 for generating shortcut paths between related objects in accordance with one or more of the various embodiments. In one or more of the various embodiments, system 400 may include various components, such as, data model 402, which may be comprised of various data objects ranging from one or more databases objects to one or more visualizations. In this example, data model 402 includes database object 404, database object 406, table object 408, table object 410, table object 412, workflow object 414, data source object 416, data source object 418, workbook object 420, sheet object 422, and sheet object 424.

In one or more of the various embodiments, visualization server computers, such as, visualization server computer 116 may be arranged to employ data models, such as, data model 402 to represent information that may be used for generating visualizations. Also, in some embodiments, data models may be used to manage other actors in a visualization system, including, users, authors, or the like.

In this example, data model 402 may have one or more root level data objects, such as, data object 404 and data object 406. Data object 404 and data object 406 represent databases that may be a source of information that drives the data model. For example, data object 404 may represent a SQL RDBMS associated with one part of an organization while data object 406 may represent an API gateway to another information provider or other databases.

In one or more of the various embodiments, data object 408, data object 410, data object 412, or the like, represent tables or table-like objects that may be provided by one or more databases. At this level of the data model, the data objects may be considered to wrap or otherwise closely model the entities provided from the databases. Accordingly, in some embodiments, properties or attributes of table or database objects may closely mirror their native representations including attribute names, objects, table names, column names, or the like. For example, data administrators may be enabled to "import" databases or tables into a data model such that the imported objects retain some or all of the features or attributes that are available in native form. In some cases, in some embodiments, one or more imported data objects may include metadata information that may be imported as well.

In one or more of the various embodiments, before an imported table object may be used for visualizations, data administrators may have to perform or execute one or more actions to the prepare the information for consumption by visualizations or visualization authors. In this example, extract-transform-load (ETL) object 414 represents an ETL process that does some processing on information in table object 410 and table object 412 before it is made available for use in visualizations.

In one or more of the various embodiments, data source objects, such as, data source 416 or data source 418 represent data objects that may be available for visualization authors to incorporate into visualizations or other display models. In some embodiments, data source objects may provide data administrators control to manage or otherwise shape the information from databases (e.g., database 404 or database 406) that may be made available to visualizations or visualization authors. For example, one or more tables in database 404 may include sensitive information that an organization want to exclude from visualizations. Accordingly, in some embodiments, by selecting mapping attributes from table objects to data source objects, data administrators may control how data is exposed from the underlying databases. In some embodiments, data administrators may be enabled select particular columns or attributes from table objects to include in data sources. Also, in some embodiments, attribute names (e.g., column names) in table objects may be mapped to different names in data sources. For example, a table column named customer_identifier in a table object may be mapped to an attributed named 'Account Number' in the data source. Further, in some embodiments, other transformations of mappings may be performed, such as, object conversions, aggregations, filtering, combining, or the like. In some embodiments, extensive or complex transformations may be encapsulated in ETL objects, or the like, whereas simpler or more common transformations may be enabled without using a separate ETL object.

In one or more of the various embodiments, edge 448 represents a mapping from a table object to a data source. In this example, edge 448 may represent the one or more data structures that map one or more attributes (e.g., columns) of table object 408 to data source 416. Accordingly, in some embodiments, edge 448 provides or is associated one or more mapping rules or instructions that define which information from table object 408 is available in data source 416, as well as, how the information from table object 408 may appear to visualization authors.

In one or more of the various embodiments, workbook object 420 represents a data object that may be associated with one or more user level data objects, such as, sheet object 422 or sheet object 424. In some embodiments, visualization authors may be enabled to design workbooks, such as, workbook object 420, based on information provided by one or more data sources, such as, data source 416 or data source 418. In some embodiments, visualization authors may design workbooks that include one or more sheets (e.g., sheet object 422 or sheet object 424. In some embodiments, sheet objects may include one or more visualizations, or the like.

In one or more of the various embodiments, sheet object 422 or sheet object 424 may represent some or all of the information that may be provided to a visualization engine, or the like, that provide one or more interactive visualization applications or reports that may be employed by users. In this example, sheet object 422 or sheet object 424 may be considered to include or reference one or more of data, meta-data, data structures, or the like, that may be used to render one or more visualizations of information that may be provided by one or more databases. In some embodiments, sheets may be arranged to include one or more display models, styling information, text descriptions, narrative information, stylized graphics, links to other sheets, or the like.

Figure 5:
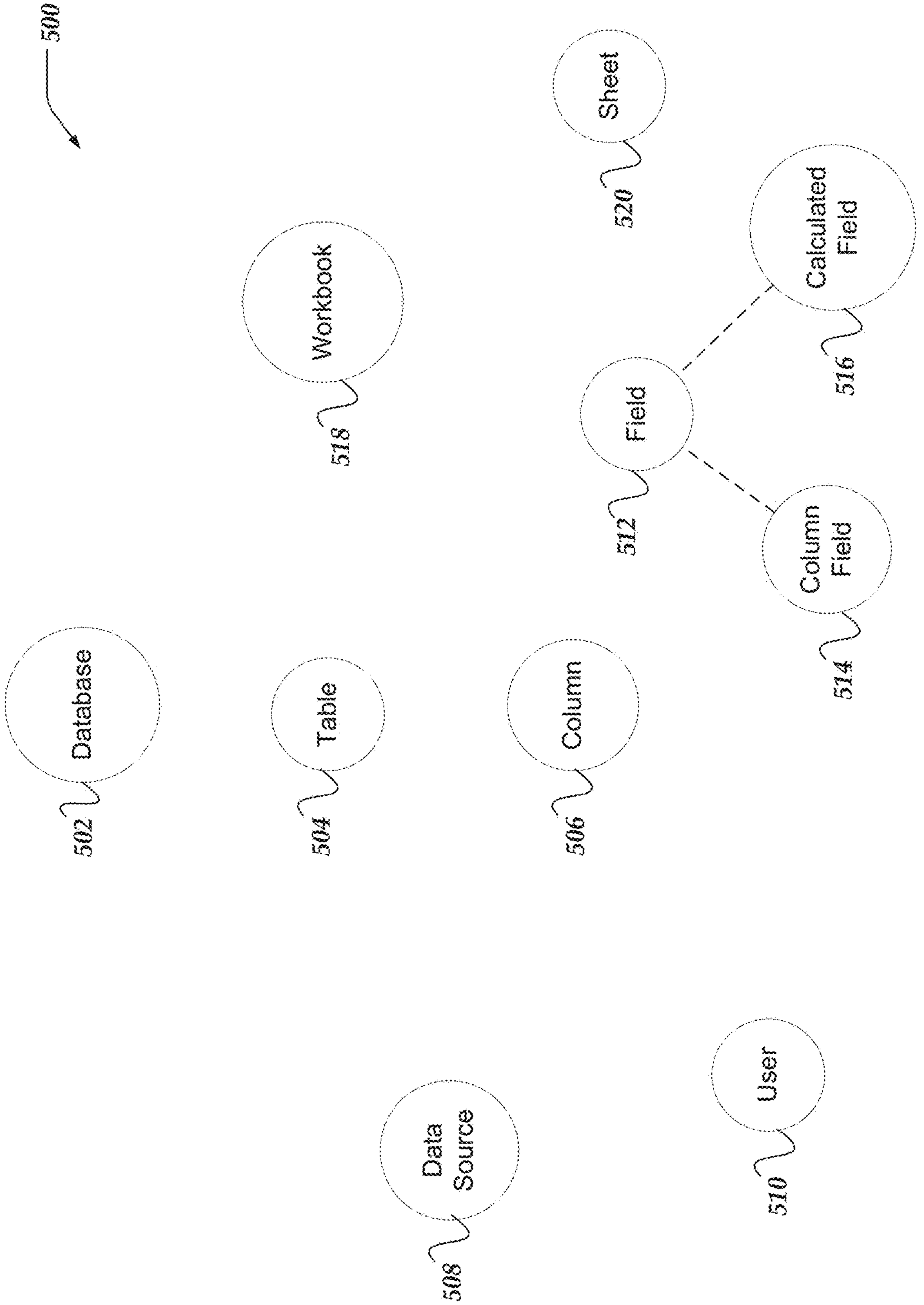
FIG. 5 illustrates a logical schematic of objects 500 for generating shortcut paths between related objects in accordance with one or more of the various embodiments.

FIG. 5 illustrates a logical schematic of objects 500 for generating shortcut paths between related objects in accordance with one or more of the various embodiments. In some embodiments, data models may be comprised of various data objects of various objects. In some embodiments, one or more objects may be composed of one or more other objects. In this example, for some embodiments, objects may include database object 502, table object 504, column object 506, data source object 508, user object 510, field object 512, column field object 514, calculated field object 516, workbook object 518, sheet object 520, or the like. In one or more of the various embodiments, each object may include one or more attributes that one or more other objects or one or more references to other objects.

In some cases, one or more attributes may include so-called built-in objects, such as, strings, integers, floating point numbers, or the like. For brevity and clarity built-in objects are omitted from this description.

In one or more of the various embodiments, various objects may be associated with a set of known behaviors or data constrains based on their definitions. Accordingly, in some embodiments, lineage engines may be arranged to programmatically interrogate objects to determine their compositions as well as rules or behavior associated.

Further, in some embodiments, employing defined objects for composing data models enables other applications or services in the visualization platform to interact correctly with each other. As described below, schema models may further declare how some objects may be composed of other objects.

Figure 6:
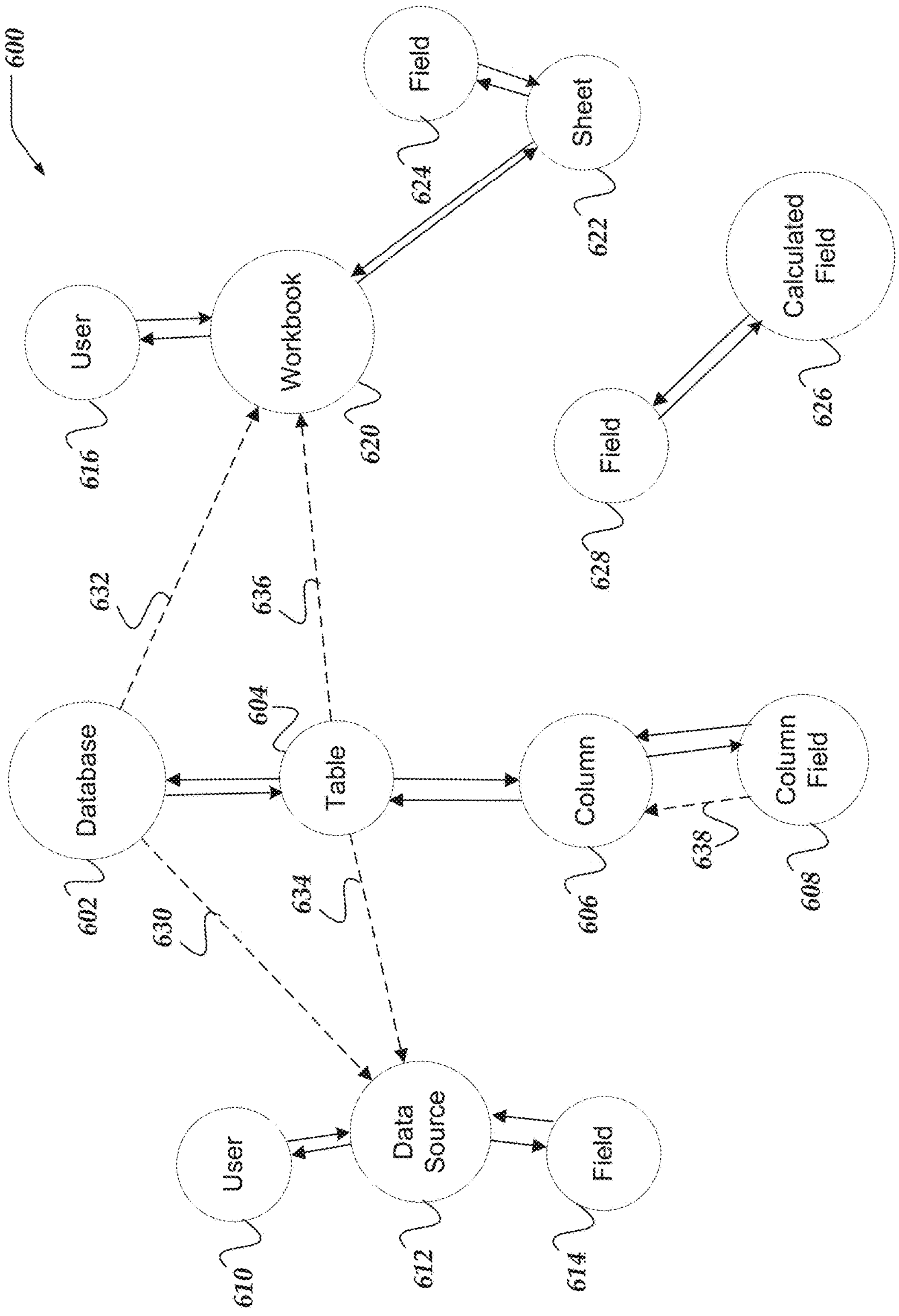
FIG. 6 illustrates a logical schematic of schema model 600 for generating shortcut paths between related objects in accordance with one or more of the various embodiments.

FIG. 6 illustrates a logical schematic of schema model 600 for generating shortcut paths between related objects in accordance with one or more of the various embodiments. In one or more of the various embodiments, scheme models, such as, schema model 600 may declare how various objects in a visualization platform may be related to each other. Accordingly, in some embodiments, schema models may declare how objects may be composed of other objects.

In one or more of the various embodiments, the same object may appear more than once in the same schema model because one or more objects may be used to compose one or more other objects as described here. Further, in one or more of the various embodiments, schema models may represent relationships between objects using directed edges. However, in some cases, for some embodiments, schema models may represent relationships between objects using two directed edges where a first directed edge may be considered to represent a relationship in one direction and a second directed edge may be considered to represent a relationship in the opposite direction. Accordingly, in one or more of the various embodiments, determining shortcuts between object nodes in data model or schema model may require information that disambiguates the two relationships represented by each pair of directed edges.

In this example, for some embodiments, table object 604 may be composed of one or more columns, represented by column object 606 and a reference to database object 602.

In this example, for some embodiments, column object 606 may be composed of one or more column field objects, represented by column field object 608.

In this example, for some embodiments, data source object 612 may be composed of one or more fields, represented by field object 614 and a reference to user object 610.

In this example, for some embodiments, calculated field object 626 may be composed of one or more references to field object 628.

In this example, for some embodiments, workbook object 620 may be composed of one or more sheet object 622 and a reference to user object 616.

In this example, for some embodiments, sheet object 622 may be composed of references to one or more fields illustrated by field object 624.

In one or more of the various embodiments, schema models may declare one or more shortcuts between one or more objects. In some embodiments, shortcuts may be considered relationships between objects that may enable more efficient queries. In this example, shortcut 630 defines a shortcut from data source objects to database objects. Likewise, in this example: shortcut 632 defines a shortcut from workbook objects to database objects; shortcut 634 defines a shortcut from table objects to data source objects; shortcut 636 defines a shortcut from table objects to workbooks objects; shortcut 638 defines a shortcut from column field objects to column objects; or the like. Note, in this example, shortcut 638 explicitly disambiguates the direction of the shortcut path from among a pair of reciprocal relationships between column object 606 and column field object 608.

In one or more of the various embodiments, shortcuts may be considered part of the objects defined in schema models similar to other objects (attributes or references). Accordingly, in some embodiments, data designers that define schema models may include a definition of shortcuts to other objects. In some embodiments, shortcuts may be arranged to be data structures that include a specific directed path between the two objects that disambiguates between the direct or inverse relationships between the two objects. In contrast, in some conventional systems, data designers may be required to manually declare a fully-qualified path definition from two objects in the schema model to disambiguate between direct/inverse relationships included in the schema model.

Absent the innovations disclosed herein, in some conventional systems, shortcuts may be defined with explicit (fully qualified) paths. However, in complex production schema models with many objects, explicit paths may be long and complex. Also, as schema models evolve over time explicit shortcut paths may also required to be updated as well. However, in some cases, organizations/persons modifying one part of a schema model may be unaware of explicit shortcut paths that may be broken in other parts of the schema model.

In contrast, in some embodiments, lineage engines may be arranged to enable data designers to define shortcuts by providing hints/definitions that are easier to express correctly than fully qualified shortcut paths. In some embodiments, hints may include naming each endpoint of a shortcut rather than requiring users/data modelers to provide a fully qualified path between two objects. Thus, in some embodiments, the lineage engines may be arranged to automatically generate unambiguous directed paths through the schema model for the shortcuts.

Note, in this example, objects with the same label may be considered the same object. For example, field object 614, field object 628, field object 624, or the like, may be considered as representing the same object.

One of ordinary skill in the art will appreciate that production schema models may include more or fewer objects that shown here.

Figure 7:
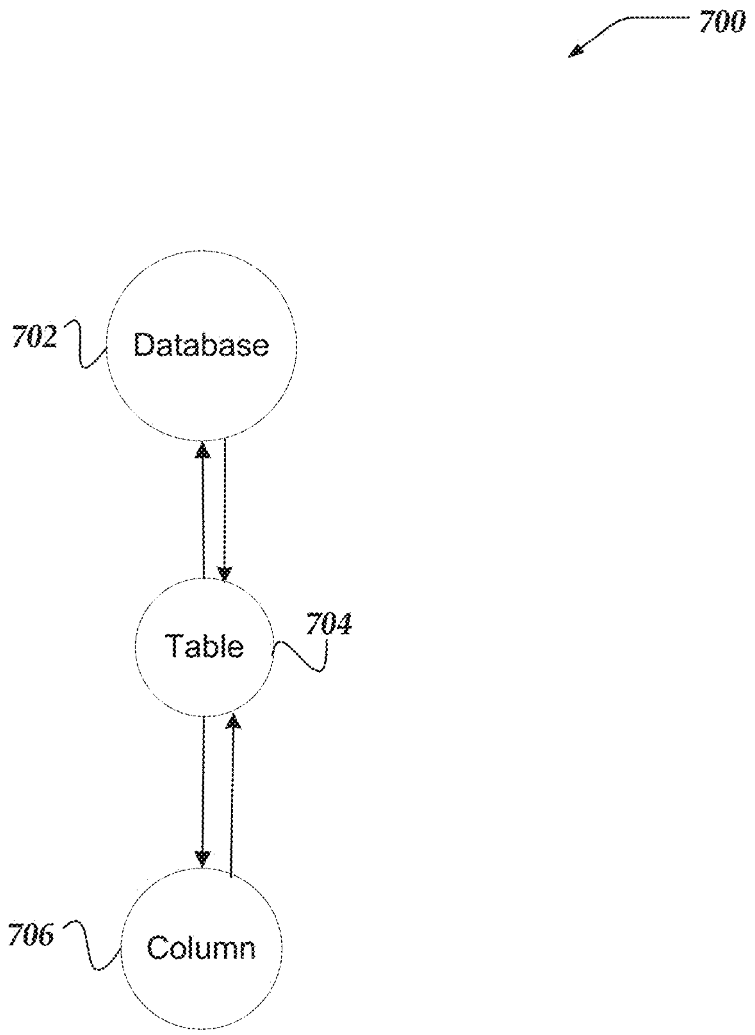
FIG. 7 illustrates a logical schematic of a closure that may be a portion of a data model in accordance with one or more of the various embodiments.

FIG. 7 illustrates a logical schematic of closure 700 that may be a portion of a data model in accordance with one or more of the various embodiments. In one or more of the various embodiments, lineage engines may be arranged to determine one or more portions of data models that may be considered closures as described below. In some embodiments, lineage engines may be arranged to execute one or more actions to determine one or more objects that may be classified together as closures. In some embodiments, a closure may one or more data structures that represent a portion of nodes and edges of a schema model that may be separated by a data flow boundary. In some cases, closures may be informally considered to be partitions of a schema model. As noted above, schema models may declare more than one closure.

In this example, closure 700 may be comprised of database object 702, table object 704 and column object 706.

In one or more of the various embodiments, lineage engines may be arranged to employ schema models, data flow boundaries, closure hints, or the like, to determine closures for a schema model or data model.

FIG. 8 illustrates a representation of data structure 800 for representing data flow boundaries for schema models in accordance with one or more of the various embodiments.

In one or more of the various embodiments, data flow boundaries may be declared by users (e.g., data modelers, data designers, or the like) based on a corresponding data model or schema model. In one or more of the various embodiments, lineage engines may be arranged to employ data flow boundaries to determine boundaries between closures in a schema model.

As described below in more detail, in some embodiments, lineage engines may be arranged to traverse schema models to identify the objects that may be grouped into closures. Accordingly, in some embodiments, lineage engines may be arranged to employ data flow boundaries to help determine conditions for stopping traversals to determine closures.

In one or more of the various embodiments, data flow boundaries may be data structures with various fields, such as, source object, target object, edge identity, flow direction, or the like.

In this example, for some embodiments, one or more data flow boundaries may be grouped into lists or arrays, such as, data flow boundary array 802. Accordingly, in this example, for some embodiments, data flow boundary 804 represents a data structure for declaring a data flow boundary.

Also, in this example, data flow boundary 804 may include one or more fields, such as, source object 806, edge identity 808, target object 810, flow direction 812, or the like. In this example, data flow boundary 804 declares a data flow boundary between column objects and column field objects along an edge identified as referencedByFields. In some embodiments, lineage engines may be arranged to employ data flow boundary 804 to determine that column fields should not be included in the same closure as columns. Similarly, other data flow boundaries in data flow boundary array 802 may define other data flow boundaries in the data model that may contribute to determining closures.

In one or more of the various embodiments, the edge declared for a data flow boundary may delineate that separation or boundary in schema model between closures. In this example, edge identity 808 declares the edge that represents the boundary.

One of ordinary skill in the art will appreciate data structures, such as, data structure 800 may be represented using various implementations, such as, JSON (as shown), XML, structures, objects, database tables, or the like, without departing from the scope of these innovations.

Also, in some embodiments, data flow boundaries may be defined as part of object definitions in other parts of data models rather than being separate data structures as shown here.

FIG. 9 illustrates a representation of data structure 900 for representing closure hints for generating shortcut paths between related objects in accordance with one or more of the various embodiments.

In one or more of the various embodiments, closure hints may be declared by users (e.g., data modelers, data designers, or the like) based on a corresponding data model. In one or more of the various embodiments, lineage engines may be arranged to employ closure hints to determine closures for data models.

As described below in more detail, in some embodiments, lineage engines may be arranged to traverse data models to identify the objects that may be grouped into closures. Accordingly, in some embodiments, lineage engines may be arranged to employ closure hint to help determine conditions for including objects into closures.

In one or more of the various embodiments, closure hints may be data structures with various fields, such as, source object, target object, edge identity, flow direction(s), or the like.

In this example, for some embodiments, one or more closure hints may be grouped into lists or arrays, such as, closure hint array 902. Accordingly, in this example, for some embodiments, closure hint 904 represents a data structure for declaring a closure hint.

Also, in this example, closure hint 904 may include one or more fields, such as, source object 906, edge identity 908, target object 910, flow directions 912, or the like. In this example, closure hint 904 declares a closure hint between column objects and table objects along an edge identified as ‘table’. In some embodiments, lineage engines may be arranged to employ closure hint 904 to determine the closures that may be employed for generating shortcut paths between related objects.

One of ordinary skill in the art will appreciate data structures, such as, data structure 900 may be implements using various representations, such as, JSON (as shown), XML, structures, objects, database tables, or the like, without departing from the scope of these innovations.

Also, in some embodiments, closure hints may be defined as part of object definitions in other parts of data models rather than being separate data structures as shown here.

Generalized Operations

FIGS. 10-16 represent generalized operations for generating shortcut paths between related objects in accordance with one or more of the various embodiments. In one or more of the various embodiments, processes 1000, 1100, 1200, 1300, 1400, 1500, and 1600 described in conjunction with FIGS. 10-16 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 10-15 may be used for generating shortcut paths between related objects in accordance with at least one of the various embodiments or architectures such as those described in conjunction with FIGS. 4-9. Further, in one or more of the various embodiments, some or all of the actions performed by processes 1000, 1100, 1200, 1300, 1400, 1500, and 1600 may be executed in part by data management engine 322, display engine 324, or lineage engine 326 running on one or more processors of one or more network computers.

Figure 10:
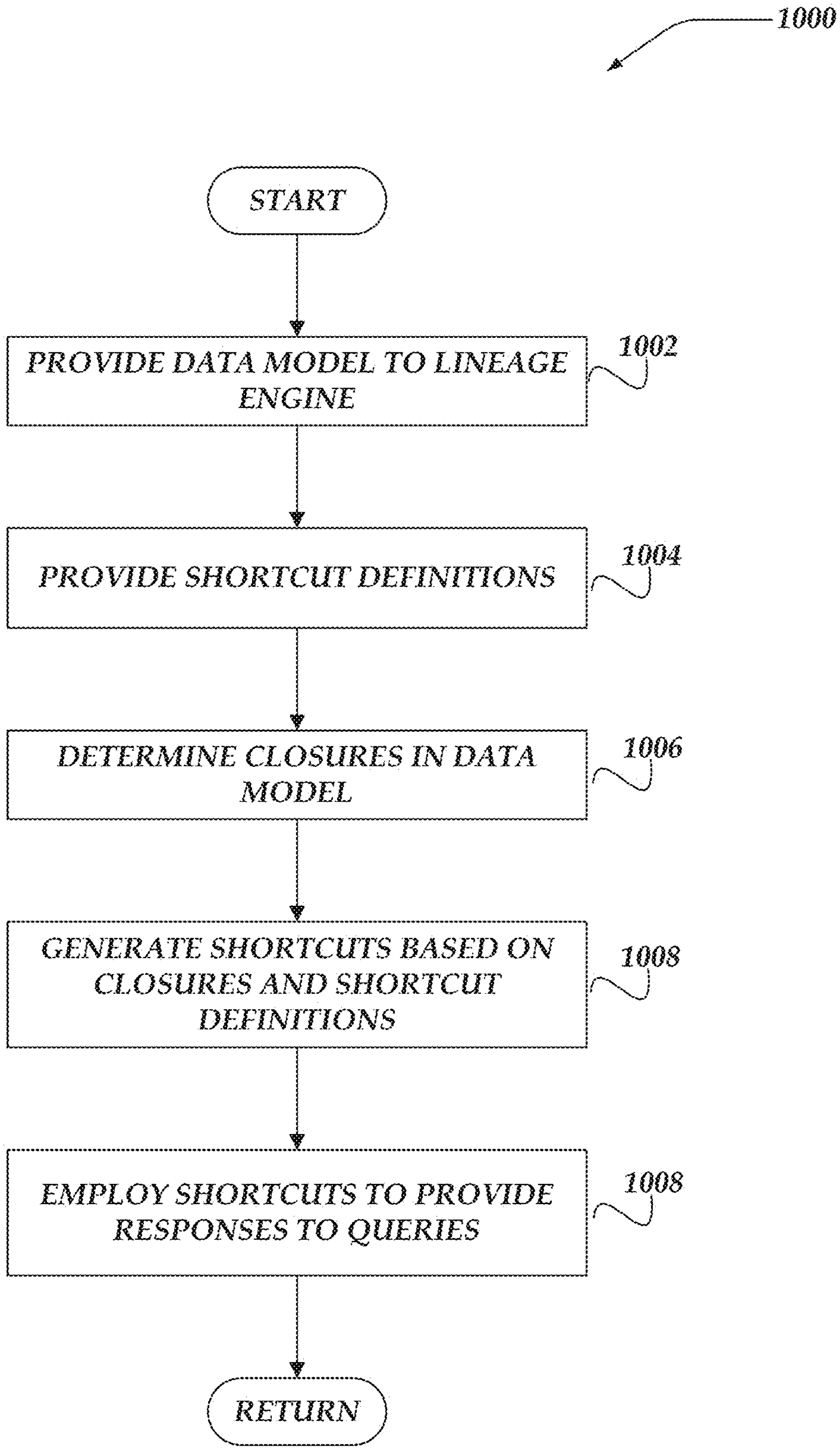
FIG. 10 illustrates an overview flowchart of a process for generating shortcut paths between related objects in accordance with one or more of the various embodiments.

FIG. 10 illustrates an overview flowchart of process 1000 for generating shortcut paths between related objects in accordance with one or more of the various embodiments. After a start block, at start block 1002, in one or more of the various embodiments, a data model may be provided to a lineage engine. As described above, a data management engine, display engine, or the like, may be arranged to generate data models that may be used by visualization authors. data modelers, or data administrators to create data objects that may be associated with various data model layers or objects in the data model.

At block 1004, in one or more of the various embodiments, one or more shortcut definitions may be provided to the lineage engine. As described above, in some embodiments, shortcut definitions may be declared by users, data modelers, data administrators. or the like. Often, shortcut definitions may be included in data model if new objects are introduced into a data model. In some embodiments, shortcut definitions may be provided to declare directed paths between one of more pairs of objects in the data model. Accordingly, in some embodiments, shortcut definitions may include at least a source object, target object, and a flow direction (e.g., up, or down). In some flow directions may be required because, in some cases, a data model may be an undirected graph or partially undirected graph such that naïve traversals of the data model may provide ambiguous or incorrect results absent the application of innovations disclosed herein. In some embodiments, data models may declare a pair of relationships between one or more of the objects—one in each direction. In some embodiments, because these paired directed edges may represent different ‘directions’, determining shortcut paths by observation may provide incorrect or ambiguous path results because it may not be clear from observation which direction the shortcut path should take through the data model.

Likewise, in some embodiments, shortcut definitions may be provided if relationships of existing objects in a data model may be modified.

In one or more of the various embodiments, shortcut definitions may be arranged to enable users to provide a minimum amount of information. However, in some embodiments, an important feature of shortcut definitions is to enable users to unambiguously define a relationship between source objects and target objects without concern for intervening objects in the data model. For example, a shortcut declared for object A to object F may produce a directed path of A->B->C->D->E->F that may be provided to traverse between objects in the data model. Thus, in this example, the shortcut definition may remain valid even when the shortcut directed path becomes A->B->E->C->D->F because of changes in the data model. In contrast, absent the innovations disclosed herein, changes to a data model may break or invalidate shortcut directed paths that are explicitly declared.

At block 1006, in one or more of the various embodiments, the lineage engine may be arranged to determine one or more closures in the data model. In one or more of the various embodiments, in preparation for generating shortcut paths from shortcut definitions, lineage engines may be arranged to evaluate the data model to determine/identify one or more closures that may be in the data model. In some embodiments, closures may be defined as portions/partitions of the data model that satisfy various specific conditions. In some embodiments, closures may be considered to be groups of related objects that fit within declared data flow boundaries.

In some embodiments, determining the objects that may be grouped into closures depends on the data flow boundaries that may be declared for a data model. As described above, data flow boundaries may be defined by declaring a flow source object, flow target object, and flow direction. Accordingly, in some embodiments, the 'boundary' is between the source object and the target object in a defined traversal direction (flow direction). In some embodiments, the selection of where to define data flow boundaries depends on the local requirements of the user, data modelers, or the like, who may be authoring or using the data model. Accordingly, in one or more of the various embodiments, closure hints may be declared by users, data modelers, data administrators, or the like. (See, FIG. 8, above)

Accordingly, in some embodiments, lineage engines may be arranged to execute one or more actions to group objects into closures. Note, in some embodiments, a given object may be included in more than one closure.

In one or more of the various embodiments, lineage engines may be arranged to generate closures at an initialization time (e.g., upon launch of the lineage engines or visualization platform, or the like) or, in some cases, closure generation may be deferred until a first query associated with a shortcut may be provided. Accordingly, in some embodiments, lineage engines may be arranged to employ rules, instructions, or the like, provided via configuration information to determine if closures should be generated.

In one or more of the various embodiments, lineage engines may be arranged to keep the closure data structures in memory or in cache for a designated duration, such as, length of current session, while the lineage engine in running, timeout, or the like. In some embodiments, lineage engines may be arranged to employ rule, instructions, or the like, provided via configuration information to determine the lifetime of one or more closure data structures.

At block 1008, in one or more of the various embodiments, the lineage engine may be arranged to generate one or more shortcut directed paths based on the one or more closures and the one or more shortcut definitions.

In one or more of the various embodiments, lineage engines may be arranged to generate the fully qualified shortcut directed paths for each declared shortcut. The shortcut directed path enables lineage engines, or the like, to correctly traverse object relationship in data model as needed.

At block 1010, in one or more of the various embodiments, the lineage engine may be arranged to employ the generated shortcut directed paths provide responses to one or more queries associated with the data model. In one or more of the various embodiments, lineage engines may be arranged to enable other applications, services, clients, or the like, to provide queries associated with the relationships in the data model. Accordingly, in some embodiments, shortcut directed paths generated for shortcuts may be employed to provide correct responses. In some embodiments, absent shortcut directed paths, some traversal paths or other relationships may be ambiguous or indeterminable.

Next, in one or more of the various embodiments, control may be returned to a calling process.

Figure 11:
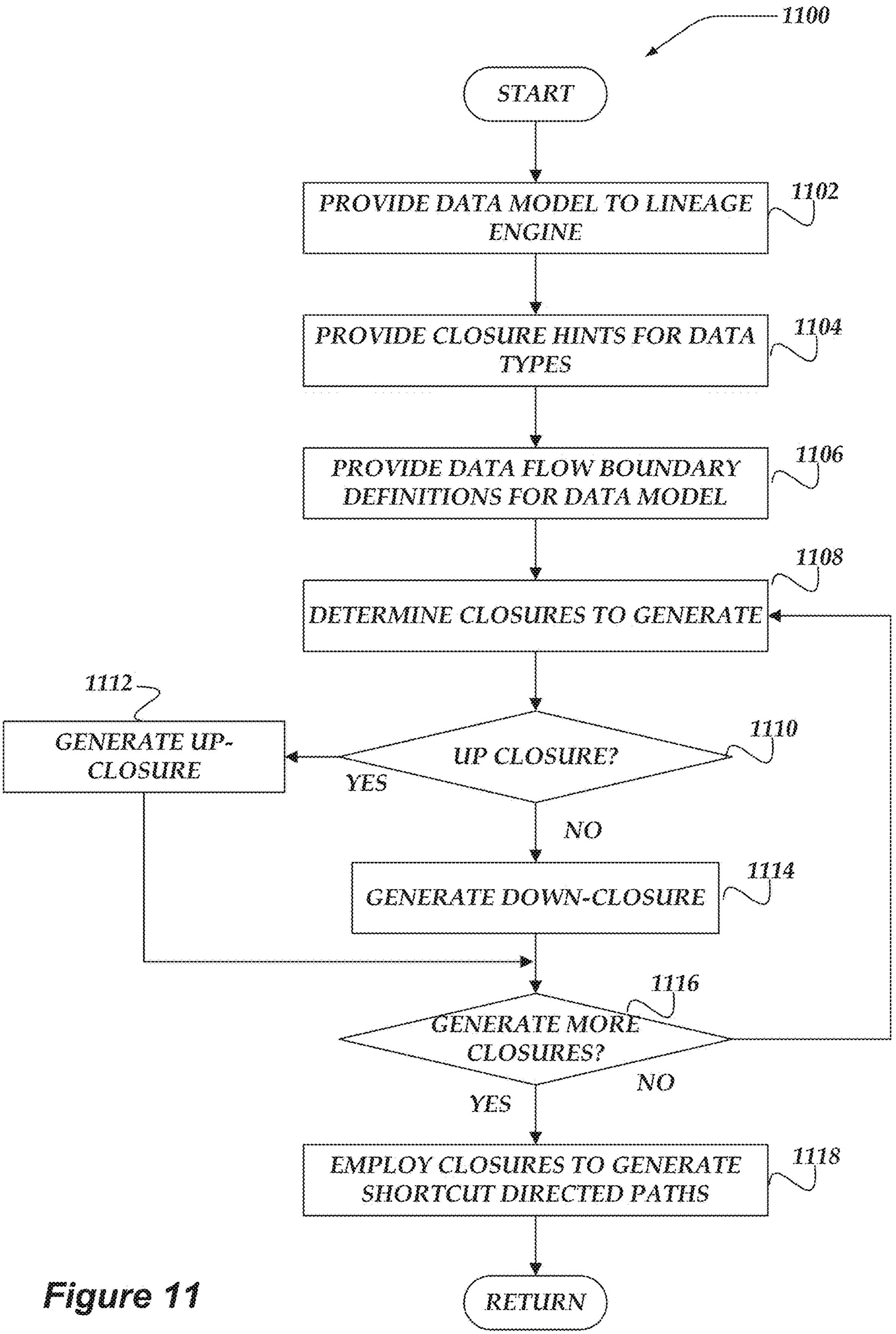
FIG. 11 illustrates a flowchart of a process for generating shortcut paths between related objects in accordance with one or more of the various embodiments.

FIG. 11 illustrates a flowchart of process 1100 for generating shortcut paths between related objects in accordance with one or more of the various embodiments. After a start block, at start block 1102, in one or more of the various embodiments, a data model may be provided to a lineage engine. As described above, data model definitions may be authored by users, such as, data modelers, data designers, administrators, application developers, or the like. In some embodiments, data model definitions may include one or more objects that may be composed of one or more other objects.

At block 1104, in one or more of the various embodiments, one or more closure hints may be proved to the lineage engine. In one or more of the various embodiments, data model definitions may include one or more closure hints or closure definitions. As described above, closures may be groups of objects that are grouped together to meet local requirements or local circumstances. In one or more of the various embodiments, the specific closure hints for a data model may be declared by users.

In one or more of the various embodiments, closure hints may be provided by configuration information that define the data model. Alternatively, in some embodiments, closure hints may be provided in files or data structures that may be separate from the information used to define data models. In some embodiments, closure hints reference objects (source object and target object), relationships (edges), and flow directions (up/down) that may be interpreted by lineage engines to generate closures.

At block 1106, in one or more of the various embodiments, one or more data flow boundaries may be provided to the lineage engine.

In one or more of the various embodiments, data model definitions may include one or more data flow boundaries definitions. As described above, data flow boundaries may be boundaries between objects that are declared to meet local requirements or local circumstances. In one or more of the various embodiments, the specific data flow boundaries for a data model may be declared by users.

In one or more of the various embodiments, data flow boundaries may be provided by configuration information that define the data model. Alternatively, in some embodiments, data flow boundaries may be provided in files or data structures that may be separate from the information used to define data models. In some embodiments, data flow boundaries reference objects (source object and target object), relationships (edges), and flow directions (up/down) that may be interpreted by lineage engines to generate data flow boundaries.

At block 1108, in one or more of the various embodiments, the lineage engine may be arranged to determine one or more closures to generate for generating shortcut paths between related objects. In one or more of the various embodiments, lineage engines may be arranged to generate one or more closures based on the closure hints. In one or more of the various embodiments, lineage engines may be arranged to generate a number of closures as provided by the closure hints.

At decision block 1110, in one or more of the various embodiments, if the closure being generated is an up closure, control may flow to block 1112; otherwise, control may flow to block 1114. In one or more of the various embodiments, closures may be up closures or down closures. In some embodiments, up closures may be closures generated from the point of view or starting point of a object that is considered to be below or downstream in the data model other members of the same closure. In some embodiments, lineage engines may be arranged to determine if a closure may be an up closure or a down closure from the closure hint associated with the closure being generated. Likewise, in some embodiments, down closures may be closures generated from the point of view or starting point of a object that is considered to be above or upstream in the data model from other members of the same closure. In some embodiments, up closures or down closure may be distinguishable because they may require different actions to generate.

At block 1112, in one or more of the various embodiments, the lineage engine may be arranged to generate an up closure. In one or more of the various embodiments, lineage engines may be arranged to execute one or more actions to generate up closures as described below in more detail.

At block 1114, in one or more of the various embodiments, the lineage engine may be arranged to generate a down closure. In one or more of the various embodiments, lineage engines may be arranged to execute one or more actions to generate down closures as described below in more detail.

At decision block 1116, in some embodiments, if more closures may be required, control may loop back to block 1108; otherwise, control may flow to block 1118. In one or more of the various embodiments, lineage engines may be arranged to continue to generate closures until at least one closure for each closure hint has been generated. In some cases, a closure hint may declare that both an up closure and a down closure should be generated for the same objects.

At block 1118, in one or more of the various embodiments, the lineage engine may be arranged to employ the one or more closures to generate shortcut directed paths. Next, in one or more of the various embodiments, control may be returned to a calling process.

Figure 12:
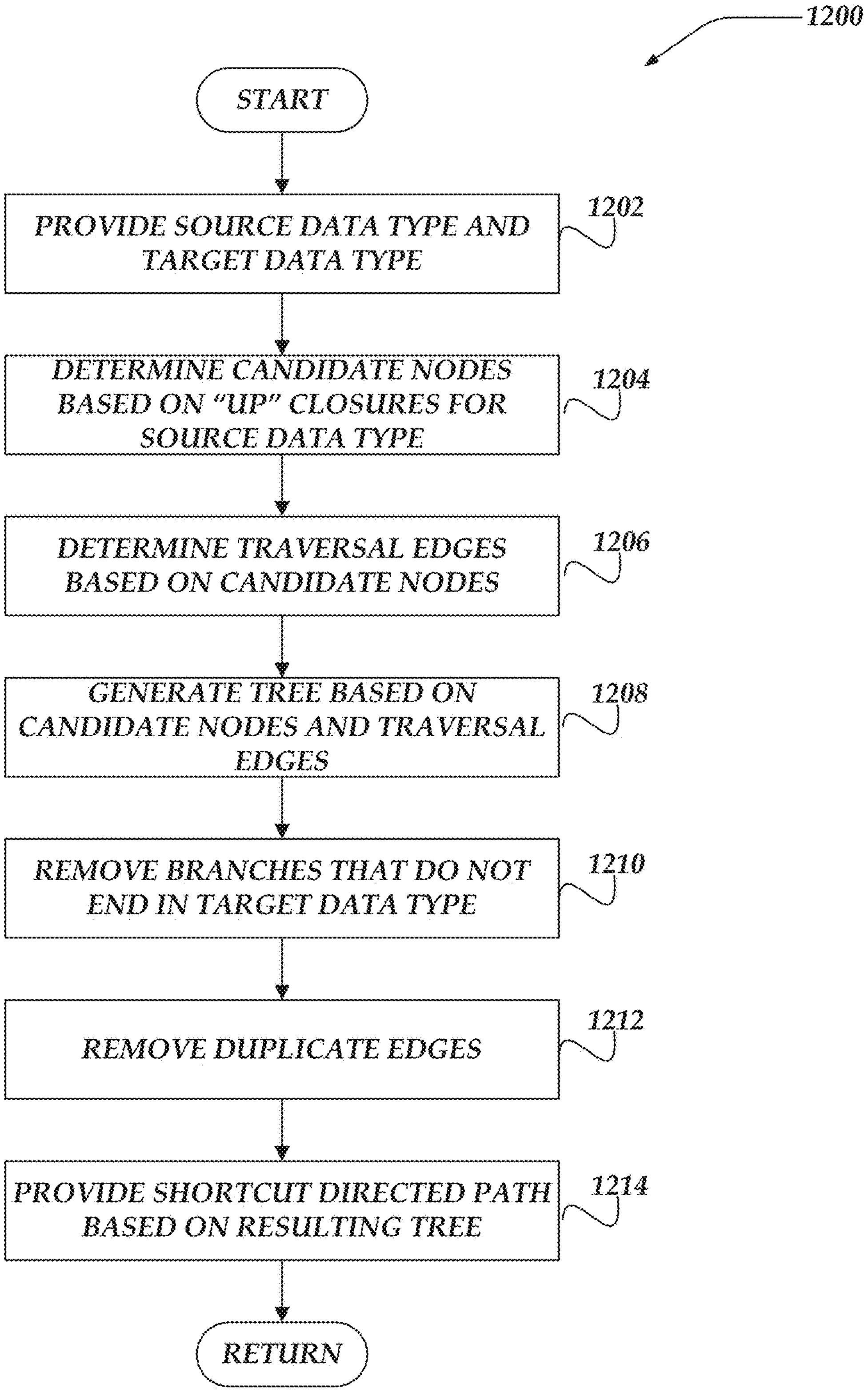
FIG. 12 is a flowchart of a process for generating closures for generating shortcut paths between related objects in accordance with one or more of the various embodiments.

FIG. 12 illustrates a flowchart of process 1200 for generating closures for generating shortcut paths between related objects in accordance with one or more of the various embodiments. After a start block, at start block 1202, in one or more of the various embodiments, a source object and target object of for a shortcut path may be provided to a lineage engine. As described above, lineage engines may be provided one or more shortcut declarations or shortcut definitions as part of (or along with) a data model definition. Accordingly, in some embodiments, each shortcut definition may identify a source object and a target object. In some embodiments, shortcut declarations may be provided using JSON, XML, text, or the like. In one or more of the various embodiments, lineage engines may be arranged to parse shortcut declarations to determine the source object and a target object. In some embodiments, the source object and target object may be considered the endpoints of the shortcut while the lineage engines may be arranged to determine intervening objects that comprise a shortcut directed path from the source object to the target object.

At block 1204, in one or more of the various embodiments, the lineage engine may be arranged to determine one or more candidate nodes based the 'up' closures for the source object.

In some embodiments, nodes in the data model may be considered to correspond to objects. Also, in some embodiments, relationships between objects may be represent by edges that connect the nodes that represent the objects in the data model.

In one or more of the various embodiments, the nodes included in the up closures may be added to a pool of candidate nodes that may be further evaluated to determine the shortcut path between the source object and target object.

At block 1206, in one or more of the various embodiments, the lineage engine may be arranged to determine one or more traversal edges based on the one or more candidate nodes. Similar collecting the candidate nodes based on the up closures associated with the source object, the edges associated with the up closures may be collected into a pool of traversal edges that may be evaluated to determine the shortcut paths.

At block 1208, in one or more of the various embodiments, the lineage engine may be arranged to generate a tree based on the initial candidate nodes and the one or more traversal edges. In one or more of the various embodiments, lineage engines may be arranged to traverse the candidate edges to generate a tree based on the candidate nodes and the traversal edges.

In one or more of the various embodiments, the tree may include one or more duplicate nodes that may represent the same object and one or more edges that represent the same relationship.

At block 1210, in one or more of the various embodiments, the lineage engine may be arranged to remove one or more branches of the tree that lead to leaves the are not the target object. In one or more of the various embodiments, the generated tree may include one or more leaf nodes. Accordingly, in some embodiments, leaf nodes that may represent objects different from the target object may be determined. In some embodiments, lineage engines may be arranged to identify and discard branches in the tree that are associated with leaf nodes that correspond to objects different from the target object.

At block 1212, in one or more of the various embodiments, the lineage engine may be arranged to remove one or more duplicate edges that may be in the tree. In one or more of the various embodiments, lineage engines may be arranged to identify duplicate edges and remove them from the tree.

At block 1214, in one or more of the various embodiments, the lineage engine may be arranged to generate a shortcut directed path based on the resulting tree. In some embodiments, the modified tree may comprise of a root node that corresponds to the source object and the remaining leaf node may correspond to the target object. Accordingly, in some embodiments, the remaining nodes and edges comprise the shortcut directed path from the source object to the target object.

Next, in one or more of the various embodiments, control may be returned to a calling process.

Figure 13:
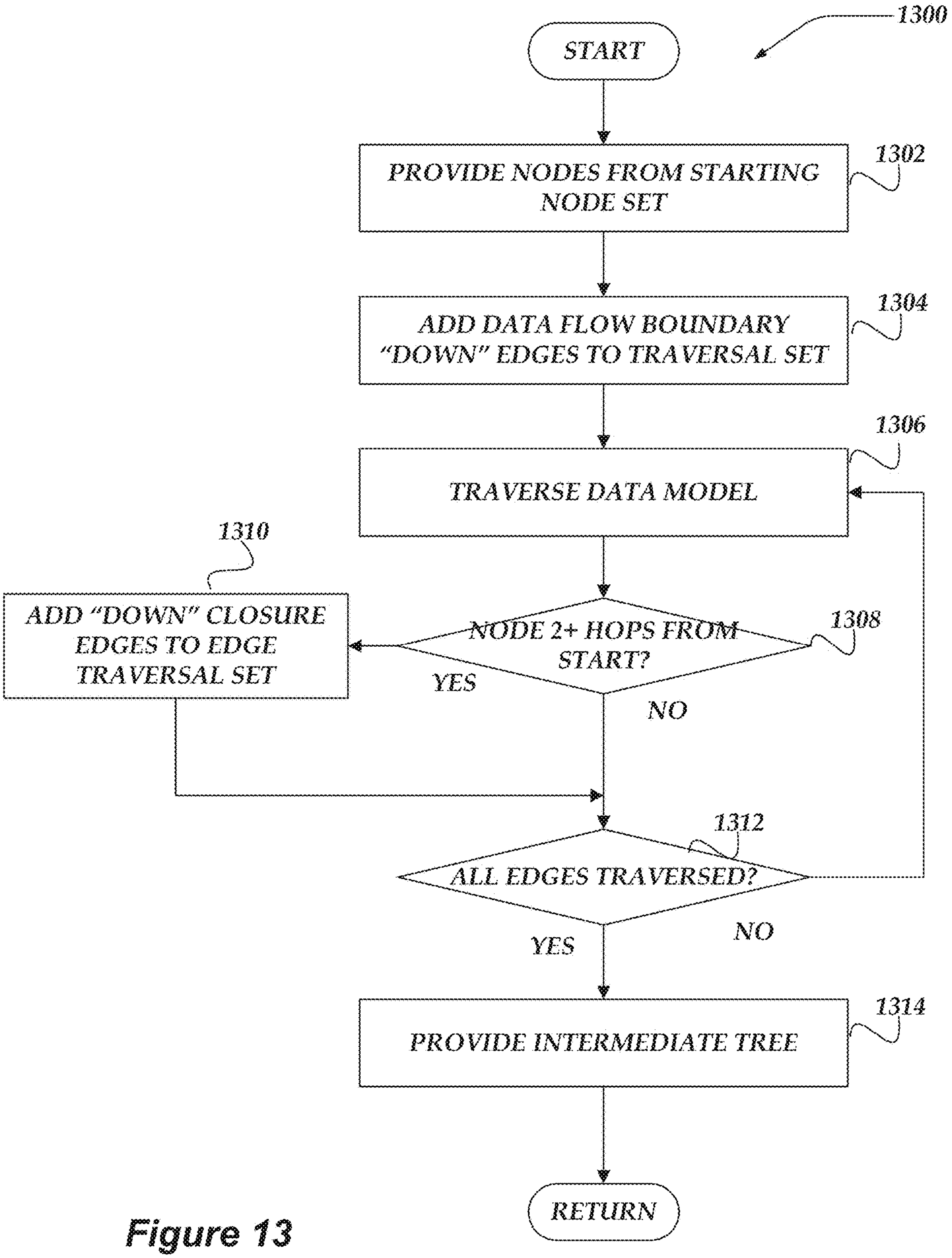
FIG. 13 is a flowchart of a process for generating shortcut paths between related objects in accordance with one or more of the various embodiments.

FIG. 13 illustrates a flowchart of process 1300 for generating shortcut paths between related objects in accordance with one or more of the various embodiments. After a start block, at start block 1302, in one or more of the various embodiments, one or more nodes corresponding to objects in the data model may be provided to the lineage engine.

In one or more of the various embodiments, lineage engines may be arranged to provide the one or more candidate nodes based on the closures associated with the source object and target object. (See, block 1204 in process 1200, FIG. 12).

At block 1304, in one or more of the various embodiments, the lineage engine may be arranged to add data flow boundary 'down' edges to the traversal set. In one or more of the various embodiments, lineage engines may be arranged to employ the information included in the data flow boundaries to determine one or more edges to include in the edge traversal pool. As described above, data flow boundary declarations include an edge definition associated with the data flow boundary.

Accordingly, in one or more of the various embodiments, lineage engines may be arranged to evaluate the candidate nodes and their associated edges to determine if there may be one or more flow boundaries. In some embodiments, the one or more edges that demark flow boundaries may be declared in the data flow boundary definitions included with the data model. In some embodiments, the edges included in the determined flow boundaries may be added to a set edges that may require traversal. For example, if a shortcut may be defined that may cross a flow boundary, those determined edges that make up the flow boundary may be traversed if searching for shortcut path.

At block 1306, in one or more of the various embodiments, the lineage engine may be arranged to traverse the data model. In one or more of the various embodiments, lineage engines may be arranged to visit the nodes in the candidate node pool and traverse the edges in the traversal edge pool.

In one or more of the various embodiments, the candidate nodes and traversal edges may be assembled into a tree-like graph with nodes corresponding to objects and edges corresponding to relationships between or among the candidate nodes.

Accordingly, in one or more of the various embodiments, lineage engines may be arranged to traverse each edge. In some circumstances, as described below, one or more edges may be added to the traversal set.

At decision block 1308, in one or more of the various embodiments, if the node currently being visited by the traversal is two or more 'hops' from the starting node, control may flow to block 1310; otherwise, control may flow to decision block 1312. In some embodiments, lineage engines may be arranged to begin the traversal at the source object determined from the shortcut declarations included with the data model. Accordingly, in some embodiments, lineage engines may be arranged to track the distance that the currently visited node may be from the starting node.

At block 1310, in one or more of the various embodiments, the lineage engine may be arranged to add 'down' closure edges to edge traversal set. In one or more of the various embodiments, closure information included in or with data model includes flow direction indicators for the defined closures to identify which of the two edges (e.g., edges in opposite direction) should be considered. Accordingly, in one or more of the various embodiments, the edges included in the 'down' closures associated with the visited node may be added to the traversal set.

At decision block 1312, in one or more of the various embodiments, if all the edges in the traversal set have been traversed, control may jump to block 1314; otherwise, control may loop back to block 1306. In some embodiments, lineage engines may be arranged to track if edges in the traversal set have been traversed. In one or more of the various embodiments, lineage engines may be arranged to add the nodes associated with traversed edges to an intermediate tree-like graph. Also, in some embodiments, lineage engines may be arranged to add the traversed edge to the intermediate tree.

At block 1314, in one or more of the various embodiments, the lineage engine may be arranged to provide the intermediate tree.

In some embodiments, lineage engines may be arranged to include duplicate objects or duplicate relationships in the intermediate tree depending on the data model. Note, the intermediate trees may be considered tree-like graphs rather than formal trees because they may not conform to formal definitions of tree graphs.

In one or more of the various embodiments, lineage engines may be arranged to perform additional operations as described above to prune/clean the intermediate tree to determine the requested shortcut directed path.

Next, in one or more of the various embodiments, control may be returned to a calling process.

Figure 14:
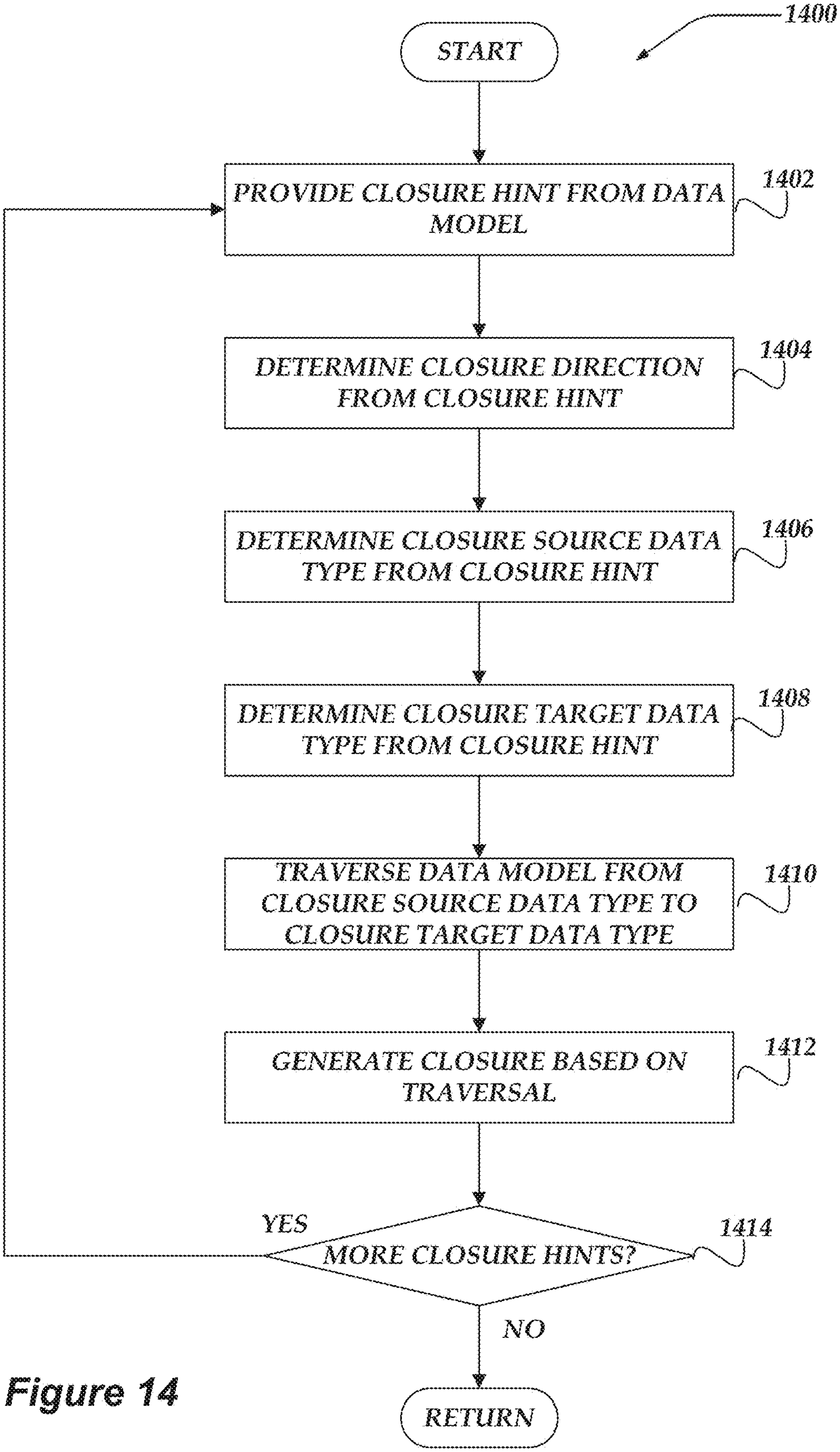
FIG. 14 is a flowchart of a process for generating closures for generating shortcut paths between related objects in accordance with one or more of the various embodiments.

FIG. 14 illustrates a flowchart of process 1400 for generating closures for generating shortcut paths between related objects in accordance with one or more of the various embodiments. After a start block, at block 1402, in one or more of the various embodiments, lineage engines may be arranged to provide a closure hint from the data model. As described above, one or more closure hints may be included or associated with a data model. In one or more of the various embodiments, closure hints declare that the lineage engine should generate a closure that includes the source object and the target object. Additional objects may be included depending on topography of the data model.

At block 1404, in one or more of the various embodiments, the lineage engine may be arranged to determine a closure direction from the closure hint. In some embodiments, closure hints include indicators if the closure may be an up closure or a down closure. In some cases, a closure hint may indicate that both up closures and down closures should be generated for a given source/target pair of objects. In some embodiments, for down closures, the edges directed away from the source object on a path towards to the target object may be considered to be edges in the down direction. In contrast, the edges directed away from the target object to the source object may be considered to be edges in the up direction.

At block 1406, in one or more of the various embodiments, the lineage engine may be arranged to determine a source object from the closure hint that may be provided with the data model. In one or more of the various embodiments, a particular object may be a source object for more than one closure.

At block 1408, in one or more of the various embodiments, the lineage engine may be arranged to determine a target object from the closure hint that may be provided with the data model. In one or more of the various embodiments, a particular object may be a target object for more than one closure.

At block 1410, in one or more of the various embodiments, the lineage engine may be arranged to traverse the data model from the closure source object to the closure target object. In one or more of the various embodiments, closure hints may include at least one named relationship that indicate an edge in the data model that may link to the source object with the target object.

At block 1412, in one or more of the various embodiments, the lineage engine may be arranged to generate a closure that corresponds to the closure hint. In one or more of the various embodiments, the closure may include at least two objects, the source object and the target object. However, in some embodiments, if the source object or the target object may be composed of additional objects, those objects may be included in the closure as well. For example, if Table object 704 in closure 700 included additional objects representing attributes or features of the table object, those objects may be included in the closure.

At decision block 1414, in one or more of the various embodiments, if there may be more closure hints to be processed, control may loop back to block 1402; otherwise, control may be returned to a calling process.

In one or more of the various embodiments, data models may be configured to include one or more closure hints. Accordingly, in some embodiments, lineage engines may be arranged to process each closure hint to generate the closures for a data model.

Figure 15:
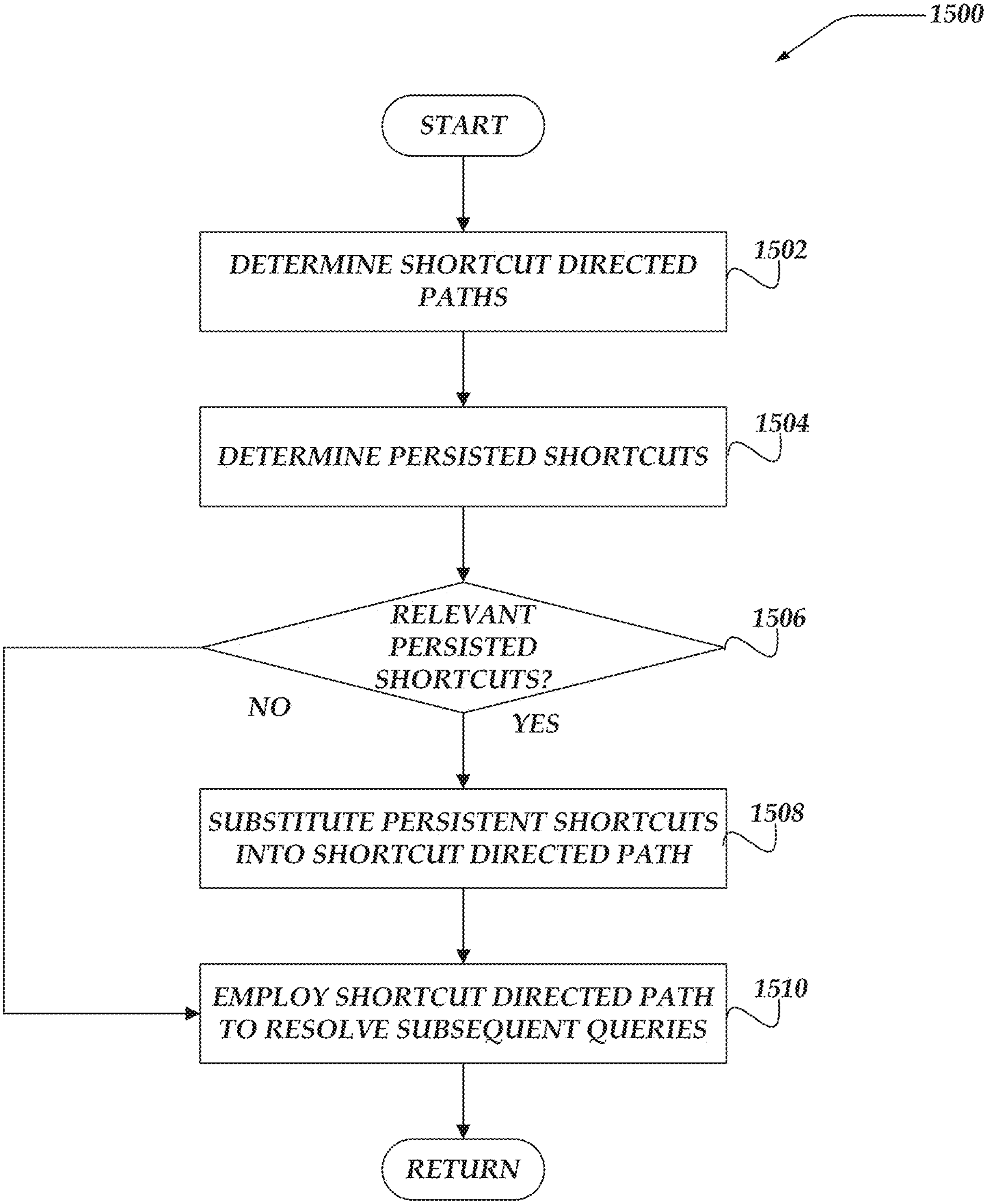
FIG. 15 is a flowchart of a process for substituting persistent shortcuts for runtime generated shortcut paths in accordance with one or more of the various embodiments.

FIG. 15 illustrates a flowchart of process 1500 for processing queries based on shortcut paths between related objects in accordance with one or more of the various embodiments. After a start block, at start block 1502, in one or more of the various embodiments, as described above the lineage engine may be arranged to generate one or more run-time shortcut paths. Accordingly, in some embodiments, lineage engines may be arranged to generate one or more shortcut directed paths from the shortcut declarations associated with the data model.

In some embodiments, lineage engines may be arranged to cache generated shortcut paths to enable their reuse during active sessions. In some embodiments, lineage engines may be arranged to provide APIs that enable query providers to request if a shortcut directed path should be cached or discarded after use. In some embodiments, lineage engines may be arranged to determine if shortcut directed paths should be cached based on timeout values, priority levels, or the like, that may be associated with shortcuts or queries.

At block 1504, in one or more of the various embodiments, the lineage engine may be arranged to determine one or more persisted shortcuts. In one or more of the various embodiments, data models may declare that one or more shortcuts may be persisted shortcuts. In some embodiments, persisted shortcuts may be generated as described above during an initialization stage and then stored for later use.

In some embodiments, one or more persistent shortcuts may be manually generated or otherwise hand-tuned by data designers. Accordingly, in some embodiments, persistent shortcuts may represent optimal or preferred paths. In some embodiments, persisted shortcuts may be included in the data model as an edge that may be traversed the same as other edges in the data model. In some embodiments, persisted shortcuts may provide direct (one-hop) relationships that may replace paths that include multiple hops.

At decision block 1506, in one or more of the various embodiments, if there may be one or more relevant persisted shortcuts, control may proceed to block 1508; otherwise, control may proceed to block 1510. In one or more of the various embodiments, relevant persisted shortcuts may include persisted shortcuts that may be related to portions of the data model that may be associated with data objects or objects that may be match the objects included in one or more runtime shortcut paths.

In some embodiments, if the persisted shortcut reduces the number of hops in a shortcut path, the lineage engine may replace the shortcut path with the persisted shortcut. In one or more of the various embodiments, lineage engines may be arranged to replace the longest qualifying runtime shortcut or runtime shortcut path portion with the persistent shortcut. Accordingly, in some cases, multi-hop paths comprising multiple nodes or edges may be replaced by a single edge represented by the persistent shortcut. Thus, in some embodiments, compute performance or memory consumption for query resolution may be reduced by reducing the number of nodes or edges that may be traversed to resolve the query.

At block 1508, in one or more of the various embodiments, the lineage engine may be arranged to substitute the one or more persisted shortcuts into the shortcut directed paths.

In some embodiments, lineage engines may be arranged to replace portions of shortcuts paths with persisted shortcut paths. For example, in some embodiments, if a generated shortcut directed path may be A->B->C->D->E (where A-E are objects) and persisted shortcut Q has a source object of B and a target object of D, persisted shortcut Q may be substituted into the shortcut as so A->[Q]->E.

At block 1510, in one or more of the various embodiments, the lineage engine may be arranged to employ the shortcut directed paths to resolve subsequent queries. Next, in one or more of the various embodiments, control may be returned to a calling process.

Figure 16:
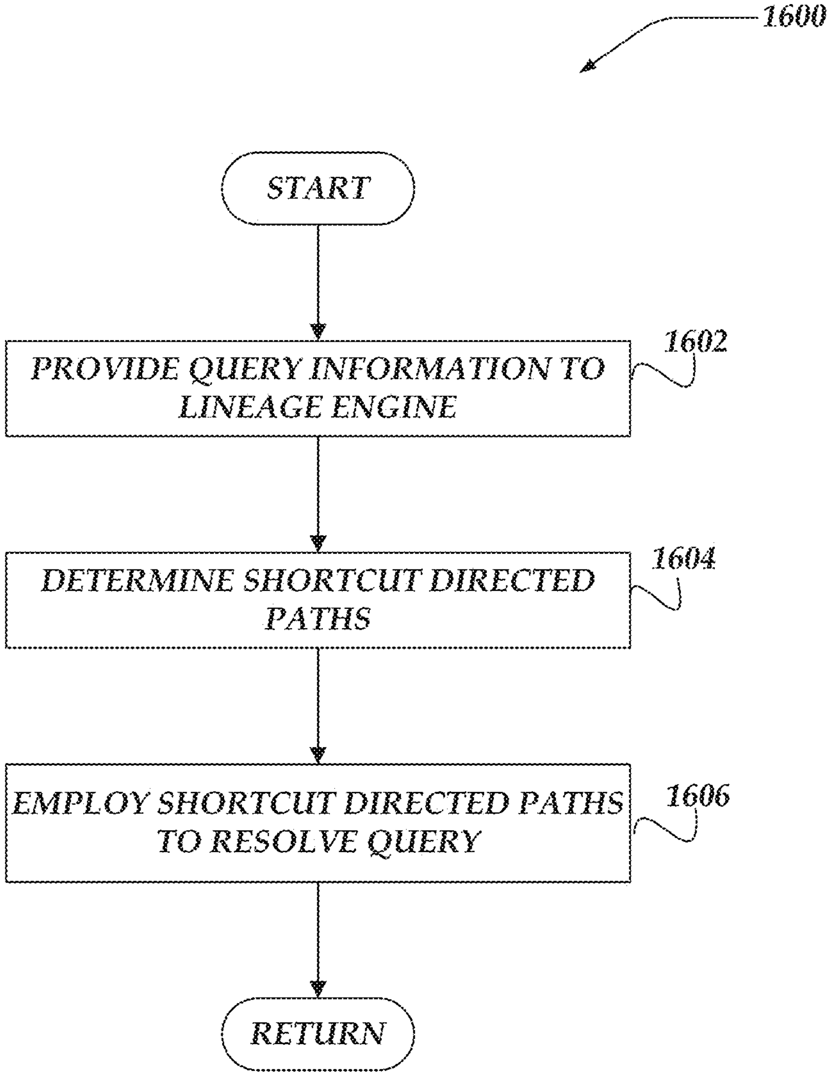
FIG. 16 is a flowchart of a process for processing queries based on shortcut paths between related objects in accordance with one or more of the various embodiments.

FIG. 16 illustrates a flowchart of process 1600 for processing queries based on shortcut paths between related objects in accordance with one or more of the various embodiments. After a start block, at start block 1602, in one or more of the various embodiments, query information may be provided to a lineage engine. In one or more of the various embodiments, the data models provided or managed by lineage engines may be employed by one or more other applications, such as, visualization platforms, or the like. The data objects and objects included in data models may be employed in user interfaces, visualizations, or the like. Accordingly, in some embodiments, such applications or services may provide one or more queries to retrieve data objects or other information about the data models. For example, an application may request information about a data source that provides one or more fields that are displayed in a user interface or visualization. Also, in some embodiments, lineage engines may be arranged to provide user interfaces that enable similar queries to support data administration or data management of data models.

In one or more of the various embodiments, lineage engines may be arranged to parse various query types in various languages or representations. In some embodiments, lineage engines may be arranged to support queries expressed using a variety of query languages, such as, SQL-like query languages, graph-based query languages, or object-based query languages. In some embodiments, lineage engines may be arranged to employ parses, rules, grammars, or the like, provided via configuration information to include/extend the supported query languages.

Accordingly, in some embodiments, lineage engines may be arranged to provide one or more APIs that enable authorized users, applications, or services to provide query information requesting information about particular data objects or objects. In one or more of the various embodiments, query information may be provided in JSON, XML, text, API parameters, or the like, or combination thereof.

At block 1604, in one or more of the various embodiments the lineage engine may be arranged to determine one or more shortcut directed paths that were generated previously based on the data model.

At block 1606, in one or more of the various embodiments, the lineage engine may be arranged to employ the one or more shortcut directed paths to resolve the query. In some embodiments, lineage engines may be arranged to parse the query information to identify if it references data objects or objects that may be associated with one or more of the directed shortcut paths.

In some embodiments, lineage engines may be arranged to employ shortcut directed paths to correctly determine query responses related to the objects in data model.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed is:

1. A method for managing data performed at a computing device having one or more processors and memory storing one or more programs configured for execution by the one or more processors, the method comprising:

identifying, by the one or more processors, a set of objects for a data visualization platform, each object in the set of objects representing a database, a data source, a table, a data field, a user, a visualization worksheet, or a calculated field;

generating based on a schema model, by the one or more processors, a data model from the set of objects, wherein each object of the set of objects is represented as a node in the data model and each directed edge in the data model identifies a relationship between a pair of objects, wherein the data model includes shortcuts and a respective shortcut includes a source object, a target object, and a flow direction, and at least some of the shortcuts are persisted shortcuts;

storing, in the memory, the data model, including the one or more shortcuts and the persisted shortcuts; and in response to receiving a query at the data visualization platform:

resolving the query by using the one or more shortcuts, wherein resolving the query comprises parsing the query and determining that the query references objects that are associated with one or more shortcuts, wherein resolving the query includes:

generating shortcut directed paths for the one or more shortcuts;

determining relevant persisted shortcuts from the persisted shortcuts in the data model, wherein the relevant persisted shortcuts are persisted shortcuts that match data types included in the one or more shortcuts;

replacing respective shortcuts with the relevant persisted shortcuts in the shortcut directed paths; and storing, in memory, the shortcut directed paths to be used for resolving subsequent queries.

2. The method of claim 1, wherein generating the shortcut directed paths comprises computing one or more closures by traversing the data model, wherein each closure comprises a portion of nodes and edges of the data model separated by a data flow boundary.

3. The method of claim 2, wherein the data flow boundary defines a boundary between column objects and column field objects along a predefined edge.

4. The method of claim 2, wherein computing the one or more closures is based on one or more closure hints for determining conditions for including objects into closures.

5. The method of claim 4, wherein the one or more closure hints comprise a closure hint for forming a closure between column objects and table objects along an edge identified as a table.

6. The method of claim 4, wherein the one or more closure hints reference objects, relationships and flow directions for generating the one or more closures.

7. The method of claim 4, wherein the one or more closure hints include indicators (i) if a closure is an up closure or a down closure, and (ii) if both up closures and down closures need to be generated for a pair of objects, wherein edges directed away from a source object on a path towards a target object are edges in a down direction for down closures, and wherein edges directed away from the target object to the source object are edges in an up direction for up closures.

8. The method of claim 4, wherein the one or more closure hints include at least one named relationship that indicate an edge in the data model that links a source object with a target object.

9. The method of claim 1, wherein each shortcut is defined by at least a source object, target object, and a flow direction.

10. The method of claim 1, wherein each shortcut corresponds to a directed path from a source object to a target object such that changes in the data model does not invalidate the shortcut.

11. The method of claim 1, wherein storing the one or more shortcuts comprises caching the generated shortcuts for a predetermined duration, for a duration of a session, or for reuse between sessions.

12. A system for visualizing data, comprising:

one or more processors;

memory coupled to the one or more processors; and one or more programs stored in the memory and configured for execution by the one or more processors, the one or more programs comprising instructions for:

identifying, by the one or more processors, a set of objects for a data visualization platform, each object in the set of objects representing a database, a data source, a table, a data field, a user, a visualization worksheet, or a calculated field;

generating based on a schema model, by the one or more processors, a data model from the set of objects, wherein each object of the set of objects is represented as a node in the data model and each directed edge in the data model identifies a relationship between a pair of objects, wherein the data model includes shortcuts and a respective shortcut includes a source object, a target object, and a flow direction, and at least some of the shortcuts are persisted shortcuts;

storing, in the memory, the data model, including the one or more shortcuts and the persisted shortcuts; and in response to receiving a query at the data visualization platform:

resolving the query by using the one or more shortcuts, wherein resolving the query comprises parsing the query and determining that the query references objects that are associated with one or more shortcuts, wherein resolving the query includes:

generating shortcut directed paths for the one or more shortcuts;

determining relevant persisted shortcuts from the persisted shortcuts in the data model, wherein the relevant persisted shortcuts are persisted shortcuts that match data types included in the one or more shortcuts;

replacing respective shortcuts with the relevant persisted shortcuts in the shortcut directed paths; and storing, in memory, the shortcut directed paths to be used for resolving subsequent queries.

13. The system of claim 12, wherein generating the shortcut directed paths comprises computing one or more closures by traversing the data model, wherein each closure comprises a portion of nodes and edges of the data model separated by a data flow boundary.

14. The system of claim 13, wherein the data flow boundary defines a boundary between column objects and column field objects along a predefined edge.

15. The system of claim 13, wherein computing the one or more closures is based on one or more closure hints for determining conditions for including objects into closures.

16. The system of claim 15, wherein the one or more closure hints comprises a closure hint between column objects and table objects along an edge identified as a table.

17. A non-transitory computer readable storage medium storing one or more programs, the one or more programs configured for execution by a computing device having one or more processors, memory, and one or more programs comprising instructions for:

identifying, by the one or more processors, a set of objects for a data visualization platform, each object in the set of objects representing a database, a data source, a table, a data field, a user, a visualization worksheet, or a calculated field;

generating based on a schema model, by the one or more processors, a data model from the set of objects, wherein each object of the set of objects is represented as a node in the data model and each directed edge in the data model identifies a relationship between a pair of objects, wherein the data model includes shortcuts and a respective shortcut includes a source object, a target object, and a flow direction, and at least some of the shortcuts are persisted shortcuts;

storing, in the memory, the data model, including the one or more shortcuts and the persisted shortcuts; and in response to receiving a query at the data visualization platform:

resolving the query by using the one or more shortcuts, wherein resolving the query comprises parsing the query and determining that the query references objects that are associated with one or more shortcuts, wherein resolving the query includes:

generating shortcut directed paths for the one or more shortcuts;

determining relevant persisted shortcuts from the persisted shortcuts in the data model, wherein the relevant persisted shortcuts are persisted shortcuts that match data types included in the one or more shortcuts;

replacing respective shortcuts with the relevant persisted shortcuts in the shortcut directed paths; and storing, in memory, the shortcut directed paths to be used for resolving subsequent queries.

* * * * *